United States Patent
Yoshihara et al.

(10) Patent No.: US 8,139,181 B2
(45) Date of Patent: Mar. 20, 2012

(54) POLARIZATION PLATE, LIQUID CRYSTAL DISPLAY DEVICE AND PROTECTIVE FILM

(75) Inventors: Masanori Yoshihara, Tokyo (JP); Kouhei Arakawa, Tokyo (JP); Kyosuke Inoue, Tokyo (JP); Taku Hatano, Tokyo (JP); Tetsuya Toyoshima, Tokyo (JP)

(73) Assignee: Zeon Corporation, Tokyo (JP)

( * ) Notice: Subject to any disclaimer, the term of this patent is extended or adjusted under 35 U.S.C. 154(b) by 418 days.

(21) Appl. No.: 12/295,278

(22) PCT Filed: Mar. 28, 2007

(86) PCT No.: PCT/JP2007/056631
§ 371 (c)(1), (2), (4) Date: Dec. 17, 2008

(87) PCT Pub. No.: WO2007/119560
PCT Pub. Date: Oct. 25, 2007

(65) Prior Publication Data
US 2009/0257003 A1     Oct. 15, 2009

(30) Foreign Application Priority Data

Mar. 31, 2006 (JP) .................. 2006-100027
Mar. 31, 2006 (JP) .................. 2006-100028
Mar. 31, 2006 (JP) .................. 2006-100029
Mar. 31, 2006 (JP) .................. 2006-100030

(51) Int. Cl.
*G02F 1/11335* (2006.01)

(52) U.S. Cl. ........ 349/96; 156/324; 359/359; 428/32.21

(58) Field of Classification Search ............. 349/20, 349/96, 117; 428/1.3, 31, 220, 141, 323, 428/480, 212; 264/1.1, 1.6, 1.34, 2.6, 2.7, 264/175, 230; 359/485, 507; 156/244.12, 156/324, 499, 555, 244.11

See application file for complete search history.

(56) References Cited

U.S. PATENT DOCUMENTS

| | | | |
|---|---|---|---|
| 4,017,436 A * | 4/1977 | Tabana et al. ............... | 523/436 |
| 7,005,176 B2 | 2/2006 | Tojo et al. | |
| 7,215,839 B2 | 5/2007 | Kawahara et al. | |
| 7,336,857 B2 | 2/2008 | Kawahara et al. | |

(Continued)

FOREIGN PATENT DOCUMENTS

CN         1512934 A         7/2004

(Continued)

OTHER PUBLICATIONS

Japanese Office Action dated Jul. 12, 2011, for Application No. 2008-510875.

*Primary Examiner* — Akm Ullah

(74) *Attorney, Agent, or Firm* — Birch, Stewart, Kolasch & Birch, LLP

(57) ABSTRACT

Provided are a polarization plate which has a high mechanical strength, which does not impair a visibility even under a high temperature and high humidity, which is excellent in flexibility and abrasion resistance, and which reduces a visible disturbance such as color unevenness due to a size change, as well as a liquid crystal display device using the polarization plate. A film composed of a plurality of layers composed mainly of thermoplastic resins is used as a first protection film used for a visible side of the polarization plate, and at least one surface layer of this first protection film is composed mainly of an acrylic resin. Furthermore, a second protection film having a specific property is disposed at a side of a liquid crystal cell.

8 Claims, 2 Drawing Sheets

U.S. PATENT DOCUMENTS

| | | | |
|---|---|---|---|
| 2004/0154734 A1* | 8/2004 | Akada et al. | 156/244.11 |
| 2006/0005925 A1* | 1/2006 | Hase et al. | 156/324 |
| 2006/0050063 A1 | 3/2006 | Tanabe et al. | |
| 2008/0094707 A1* | 4/2008 | Tsukane et al. | 359/507 |
| 2008/0160223 A1* | 7/2008 | Nishimura | 428/1.31 |

FOREIGN PATENT DOCUMENTS

| | | |
|---|---|---|
| JP | 08-166849 A | 6/1996 |
| JP | 11-223728 A | 8/1999 |
| JP | 2001-215331 A | 8/2001 |
| JP | 2002-196140 A | 7/2002 |
| JP | 2002-331616 A | 11/2002 |
| JP | 2003-041205 A | 2/2003 |
| JP | 2004-163924 A | 6/2004 |
| JP | 2004-226799 A | 8/2004 |
| JP | 2004-240087 A | 8/2004 |
| JP | 2004-291302 A | 10/2004 |
| JP | 2004-325971 A | 11/2004 |
| JP | 2004-330183 A | 11/2004 |
| JP | 2005-156801 A | 6/2005 |
| JP | 2005-189623 A | 7/2005 |
| JP | 2005-309339 A | 11/2005 |
| JP | 2006-72309 A | 3/2006 |
| JP | 2006-79149 A | 3/2006 |
| JP | 2007-017555 A | 1/2007 |
| WO | WO 03/049943 A1 | 6/2003 |

* cited by examiner

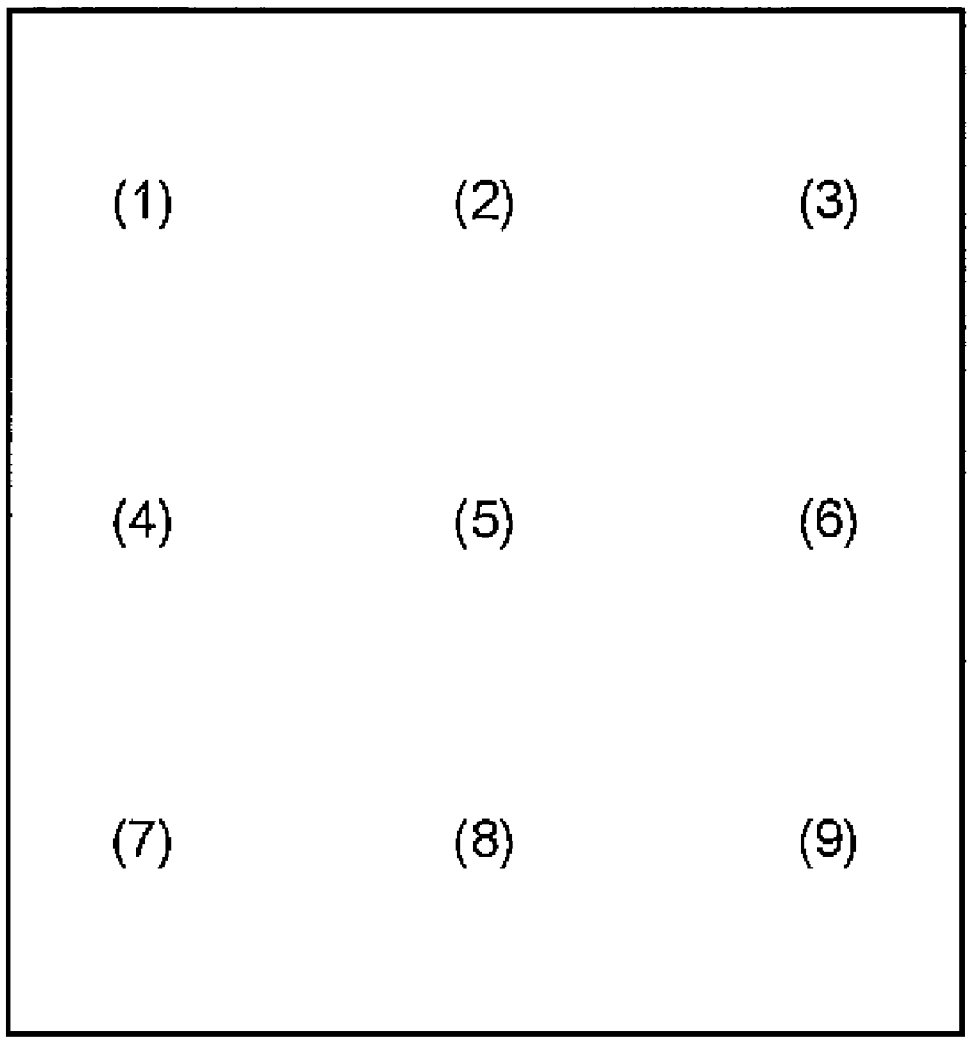

POLARIZATION PLATE, LIQUID CRYSTAL DISPLAY DEVICE AND PROTECTIVE FILM

TECHNICAL FIELD

The present invention relates to a polarization plate which has excellent mechanical strength, which does not cause size change even under a high temperature and high humidity environment, which can keep a high visibility, and which is excellent in abrasion resistance. The present invention also relates to a liquid crystal display device having this polarization plate.

BACKGROUND ART

A polarization plate for use in liquid crystal display devices is composed at least of a polarizer and two protection films opposing each other and sandwiching the polarizer. As the polarizer which composes this polarization plate, a film obtained by the following procedure is usually used. That is, a film of polyvinyl alcohol is prepared by a solution flow casting method, and the film is subjected to absorption treatment with iodine or a dichroic dye and then elongated in a boric acid solution.

As the protection film, a triacetylcellulose film (TAC film) is commonly used because of its excellent transparency. However, the TAC film has a high moisture permeability, and thus, its size can change due to moisture absorption under the high temperature and high humidity environment to cause an optical distortion. Therefore its reliability has not been always sufficient.

As an alternative protection film in place of the TAC film, there have been proposed films having low moisture permeability such as olefin based films or polyester based films. However, if the polarizer is attached to such a protection film having extremely low moisture permeability, removal of the moisture contained in the polarizer becomes insufficient and the moisture remains in the polarizer. This moisture disadvantageously reduces adhesiveness between the polarizer and the protection film.

In order to satisfy both moisture permeability and adhesiveness, there has been proposed a protection film obtained by laminating a cellulose ester based resin on the film having a low moisture permeability. For example, Patent Document 1 (JP 2004-226799-A) proposes to use a laminated film composed of a polyester resin layer and a hydrophobic cellulose ester resin layer as a protection film.

Patent Document 2 (JP 2002-331616-A) discloses a polarization plate comprising a polarizer and a laminate attached thereto as a polarization plate protection film, wherein the laminate is obtained by flow casting a resin composition composed of a maleimide/olefin copolymer and an acrylonitrile/styrene copolymer to form a film substrate, and then applying thereon a cellulose-based resin as an adhesive layer.

In addition, Patent Document 3 (JP 2001-215331-A) discloses a polarization plate obtained by attaching to a polarizer a laminate film, wherein the laminate film is obtained by applying the cellulose resin to a surface layer of a core layer composed of a resin layer.

DISCLOSURE OF INVENTION

Problem to be Solved by the Invention

Although the polarization plates disclosed in the aforementioned Patent Documents have sufficient adhesiveness in usual use, the mechanical strength of those polarization plates are still insufficient.

The polarization plate protection film used for the polarization plate disclosed in the aforementioned Patent Documents is obtained by applying on a film having low moisture permeability a coating solution in which cellulose ester has been dissolved, and then drying this coated solution. Thus, the resulting film contains a certain amount or more of a residual solvent. Consequently, when the polarization plate having these films is placed under the high temperature and high humidity environment, the film shrinks when the residual solvent is vaporized, or a polarization degree of the polarizer to which the aforementioned film has been attached is reduced. Thus, at present there is a need for a polarizing plate having a high optical performance even under the high temperature and high humidity environment and having an excellent strength.

Furthermore, in the prior art, there is a need on the polization plate and the protection film thereof to reduce visibility disturbance such as color unevenness due to the size change, and to enhance properties such as hardness of the surface, scratch resistance, transparency, low thermal expansibility, weather resistance, ultraviolet light transmission prevention effect and moldability.

The present invention has been made in the light of the aforementioned problems in the prior art, and its object is to provide a polarization plate which has high mechanical strength, does not impair the visibility even under the high temperature and high humidity environment, is excellent in abrasion resistance and reduces the visibility disturbance such as color unevenness due to the size change; a protection film which can be used for the surface of such a polarization plate and can enhance the properties such as hardness of the surface, scratch resistance, transparency, low thermal expansibility, weather resistance, ultraviolet light transmission prevention effect and moldability; and a liquid crystal display device using the polarization plate.

Means for Solving Problem

As a result of extensive experiments and examinations for solving the aforementioned problems, the present inventors have found that the aforementioned problems can be solved by using a film composed of a plurality of layers comprising thermoplastic resins as the protection film used for the polarization plate, constituting the layer located most distantly from the polarizer of this protection film by an acrylic resin, and further making a protection layer disposed at a liquid crystal cell side a specific one.

That is, the present invention provides the following:

(1) A polarization plate comprising a polarizer and two protection films disposed sandwiching said polarizer, a first protection film of said two protection films having a plurality of layers containing a thermoplastic resin, the layer among said plurality of layers which is the most distant from said polarizer being composed of a thermoplastic resin which is an acrylic resin, and a photoelastic coefficient of a second protection film of said two protection films being $-20\times10^{-13}$ to $20\times10^{-13}$ cm$^2$/dyn.

(2) A polarization plate comprising a polarizer and two protection films disposed sandwiching said polarizer, a first protection film of said two protection films having a plurality of layers containing a thermoplastic resin, the layer among said plurality of layers which is the most distant from said polarizer being composed of a thermoplastic resin which is an acrylic resin, and a second protection film of said two protection films being an optical compensation film having a biaxial property.

(3) A polarization plate comprising a polarizer and two protection films disposed sandwiching the polarizer, a first protection film of said two protection films having a plurality of layers containing a thermoplastic resin, the layer among said plurality of layers which is the most distant from said polarizer being composed of a thermoplastic resin which is an acrylic resin, and a second protection film of said two protection films being an optical compensation film wherein a ratio of a retardation value Re (450) measured at a wavelength of 450 nm relative to a retardation value Re (550) measured at a wavelength of 550 nm Re(450)/Re(550) is 1.007 or less.

(4) The polarization plate according to any one of the aforementioned (1) to (3), wherein:

said first protection film has an intermediate layer and surface layers provided on both surfaces of this intermediate layer, among said intermediate layer and said surface layers, at least said intermediate layer contains an ultraviolet light absorber, and a concentration of said ultraviolet light absorber in said intermediate layer is higher than those in the other layers.

(5) The polarization plate according to the aforementioned (4), wherein only said intermediate layer contains said ultraviolet light absorber.

(6) The polarization plate according to any one of the aforementioned (1) to (3), wherein a moisture permeability of at least one of said two protection films is 10 g/24h·m² or more and less than 200 g/day·m².

(7) The polarization plate according to any one of the aforementioned (1) to (3), wherein at least one of said two protection films was obtained by an extrusion molding method.

(8) The polarization plate according to any one of the aforementioned (1) to (3), wherein the film thickness of at least one of said two protection films is 200 µm or less.

(9) The polarization plate according to any one of the aforementioned (1) to (3), wherein a surface of said first protection film or said second protection film, said surface being opposite to said polarizer, is a flat plane on which a linear concave portion or a linear convex portion is not substantially formed.

(10) The polarization plate according to any one of the aforementioned (1) to (3) further comprising an optical function layer provided on a surface of said first protection film, said surface being opposite to said polarizer.

(11) The polarization plate according to the aforementioned (10), wherein said optical function layer is an antireflection layer.

(12) The polarization plate according to any one of the aforementioned (1) to (3), wherein said second protection film is a film having a birefringent property.

(13) The polarization plate according to the aforementioned (1), wherein both an absolute value of its retardation in an in-plane direction (Re) and an absolute value of a retardation in a thickness direction (Rth) of said second protection film are 3 (nm) or less.

(14) A liquid crystal display device comprising a light source, an incident-side polarization plate, a liquid crystal cell and an emission side polarization plate in this order, at least either one of said incident-side polarization plate and said emission side polarization plate being the polarization plate according to the aforementioned (1) or (2), and the second protection film thereof being disposed to face said liquid crystal cell.

(15) The polarization plate according to the aforementioned (3), wherein said optical compensation film functions as a circular polarization plate which is a quarter wavelength plate.

(16) A reflective type liquid crystal display device comprising a reflection plate, a liquid crystal cell and an emission-side polarization plate in this order, said emission-side polarization plate being the polarization plate according to the aforementioned (15) and the quarter wavelength plate of said polarization plate being located closer to said liquid crystal cell than the polarizer of said polarization plate.

(17) A transreflective type liquid crystal display device comprising an incident-side polarization plater a transreflective type liquid crystal cell and an emission-side polarization plate in this order, at least either one of said incident-side polarization plate and said emission-side polarization plate being the polarization plate according to the aforementioned (15), and the quarter wavelength plate of said polarization plate being located closer to said liquid crystal cell than the polarizer of said polarization plate.

(18) A touch panel for a surface panel of a display device, said panel comprising a first transparent substrate provided on a device surface, and a second transparent substrate disposed in a distantly opposed manner to said first transparent substrate, said first transparent substrate having the polarization plate according to (15) on said device surface, and the quarter wavelength plate of said polarization plate being located closer to said second substrate than the polarizer of said polarization plate.

(19) A protection film comprising an intermediate layer containing a thermoplastic resin 1, a surface layer 2 containing a thermoplastic resin 2 laminated on a surface of said intermediate layer, and a surface layer 3 containing a thermoplastic resin 3 laminated on the other surface of said intermediate layer, either one or both of said surface layer 2 and said surface layer 3 being composed of an acrylic resin having a glass transition temperature (Tg) of 100° C. or higher, said intermediate layer containing an ultraviolet light absorber, and one or more of said intermediate layer, said surface layer 2 and said surface layer 3 containing elastic particles.

(20) The protection film according to the aforementioned (19), wherein said elastic particles are contained in said surface layer 2 and/or said surface layer 3.

(21) The protection film according to the aforementioned (19), wherein, among said surface layers 2 and 3, at least one surface layer which is opposite to an object to be protected is composed of said acrylic resin having the glass transition temperature (Tg) of 100° C. or higher.

Effect of the Invention

The polarization plate of the present invention can accomplish the following effects.

The abrasion resistance and the mechanical strength are high, and the sufficient visibility can be accomplished even under the high temperature and high humidity.

The mechanical strength is high, a light leakage is reduced, the laminated films are not delaminated, and a good optical compensation function is exhibited compared with the conventional polarization plate even in the use under the high temperature and high humidity.

The mechanical strength is high, and the light leakage and delamination are reduced compared with the conventional polarization plate even in the use under the high temperature and high humidity.

Thus, the polarization plate of the present invention can be suitably used for flat panel displays such as touch panels and liquid crystal displays, and particularly the display devices having a big screen of 40 inches or more.

According to the protection film for the display device of the present invention, the scratch resistance, an appearance, the transparency and the low thermal expansibility can be remarkably enhanced while keeping the conventional properties such as ultraviolet light transmission prevention effect. Thus, by using the protection film of the present invention for general display devices, it is possible to prolong a scratch resistant lifetime of the display device and also enhance the appearance and the moldability.

BRIEF DESCRIPTION OF DRAWINGS

FIG. 3 is a plan view illustrating locations of measurement points for measuring a light leakage degree of the polarization plate in Examples of the present invention.

BEST MODE FOR CARRYING OUT THE INVENTION

Figure 1:
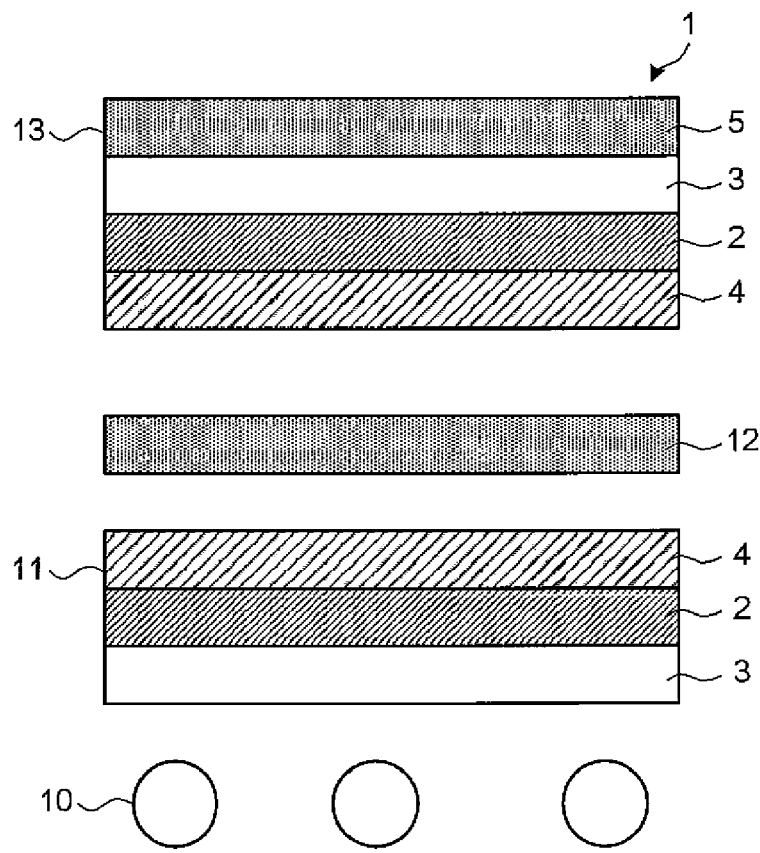
FIG. 1 is a cross-sectional view schematically showing a liquid crystal display device having a polarization plate of the present invention.

As described above, the polarization plate according to the present invention is a polarization plate comprising a polarizer and two protection films opposing each other sandwiching the polarizer, characterized in that a first protection film of the two protection films has a plurality of layers containing thermoplastic resins wherein the thermoplastic resin which composes the layer located most distantly from the polarizer among the aforementioned layers is an acrylic resin and in that a second protection film of the two protection films has a specific property which will be described later.

The polarizer which composes the polarization plate of the present invention, the acrylic resin and other thermoplastic resins which compose the first protection film, an optical function layer which is an additional constituent element which composes the first protection film, and the second protection film will be sequentially described hereinbelow.

The polarizer used in the present invention is a publicly known polarizer used for the liquid crystal display devices. Examples thereof may include those obtained by subjecting a polyvinyl alcohol film to an absorption treatment in iodine or a dichroic dye and then uniaxially elongation in a boric acid solution, or those obtained by subjecting a polyvinyl alcohol film to an absorption treatment in iodine or the dichroic dye, then to elongation, and further to modification of a part of polyvinyl alcohol units in the molecular chain into a polyvinylene unit. Additionally, polarizers such as grid polarizers, multilayer polarizers and cholesteric liquid crystal polarizers having a function to separate polarized lights into a reflected light and a transmitted light may also be enumerated as examples. Among them, the polarizer containing polyvinyl alcohol is preferable.

When a natural light enters into the polarizer used in the present invention, only one polarized light is transmitted. A polarization degree of the polarizer used in the present invention is not particularly limited, and is preferably 98% or more and more preferably 99% or more. An average thickness of the polarizer is preferably 5 to 80 μm.

The first protection film has a plurality of layers comprising a thermoplastic resin. Preferably, each layer is composed mainly of the thermoplastic resin. "Being composed mainly of" the thermoplastic resin herein refers to that a content of the thermoplastic resin in the layer is usually 50% by weight or more, preferably 80% by weight or more and more preferably 90% by weight or more.

Examples of the thermoplastic resin for composing the first protection film may include acrylic resin, as well as polycarbonate resins, polyether sulfone resins, polyethylene terephthalate resins, polyimide resins, polymethyl methacrylate resins, polysulfone resins, polyarylate resins, polyethylene resins, polystyrene resins, polyvinyl chloride resins, diacetate cellulose, triacetate cellulose, and alicyclic olefin polymers.

Examples of the alicyclic olefin polymers may include cyclic olefin random multicomponent copolymers described in JP Hei-05-310845-A and U.S. Pat. No. 5,179,171, hydrogenated polymers described in JP Hei-05-97978 A and U.S. Pat. No. 5,202,388, and thermoplastic dicyclopentadiene ring-opening polymers and hydrogenated products thereof described in JP Hei-11-124429 A (International Publication 99/20676).

The molecular weight of the thermoplastic resin used in the present invention is usually 5,000 to 100,000, preferably 8,000 to 80,000 and more preferably 10,000 to 50,000 as a weight average molecular weight (Mw) in terms of polyisoprene when measured by gel permeation chromatography (hereinbelow abbreviated as "GPC") using cyclohexane (when the resin is not dissolved therein, toluene) as the solvent. When the weight average molecular weight is in such a range, the mechanical strength and a molding workability of the protection film are suitably well-balanced.

The molecular weight distribution [weight average molecular weight (Mw)/number average molecular weight (Mn)] of the thermoplastic resin is not particularly limited, and is usually 1.0 to 10.0, preferably 1.0 to 4.0 and more preferably 1.2 to 3.5.

In the thermoplastic resin, the content of a resin component having a molecular weight of 2,000 or less (i.e., an oligomer component) is 5% by weight or less, preferably 3% by weight or less and more preferably 2% by weight or less. When the content of the oligomer component is high, it is possible that fine asperity occurs in an intermediate layer and a surface layer and thickness unevenness occurs in each layer to impair a figure tolerance when the laminate is produced.

In order to reduce the content of the oligomer component, optimization may be performed as to the matters such as: selection of a polymerization catalyst and a hydrogenation catalyst; reaction conditions of a polymerization reaction and a hydrogenation reaction; and a temperature condition in a process for pelletizing the resin as a material for molding. Amount of the oligomer component can be measured by the gel permeation chromatography using cyclohexane (if the polymer resin is not dissolved, toluene).

In the present invention, the layer which is the most distant from the polarizer among the layers composing the first protection film is composed of a thermoplastic resin which is an acrylic resin. The glass transition temperature (Tg) of the acrylic resin may be usually 100° C. or higher, preferably 100 to 170° C. and more preferably 100 to 140° C.

This acrylic resin is a copolymer resin composed mainly of (meth)acrylate ester, and may be a homopolymer or the copolymer composed of (methacrylate ester alone, or the copolymer of (moth)acrylate ester and a monomer copolymerizable therewith. One species of the acrylic resin may be used alone or two or more species thereof may be used in combination. In the present specification, examples of the layer "composed of the acrylic resin" may include, in addition to a layer composed of the acrylic resin alone, layers containing other additional materials than the acrylic resin, such as ultraviolet light absorbers and other additives and elastic fine particles which will be described later. The content of the acrylic resin in the layer composed of the acrylic resin may be preferably 70% by weight or more, and more preferably 70 to 95% by weight.

Among the aforementioned acrylic resins, polymethacrylate resins are preferable and polymethyl methacrylate resins are more preferable for the present invention.

In the present specification, (meth)acrylic acid means acrylic acid and/or methacrylic acid. Likewise, (meth)acrylate ester means acrylate ester and/or methacrylate ester.

As (meth)acrylate ester used as a major component of the acrylic resin, those having the structure derived from (meth)acrylic acid and alkanol having 1 to 15 carbon atoms and cycloalkanol are preferable. More preferably are those having the structure derived from (meth)acrylic acid and alkanol having 1 to 8 carbon atoms. When a number of the carbon atoms is too many, the value of break elongation of the resulting brittle film may become too large.

Specific examples of (methacrylate ester may include methyl acrylate, ethyl acrylate, n-propyl acrylate, i-propyl acrylate, n-butyl acrylate, i-butyl acrylate, sec-butyl acrylate, t-butyl acrylate, n-hexyl acrylate, cyclohexyl acrylate, n-octyl acrylate, 2-ethylhexyl acrylate, n-decyl acrylate, n-dodecyl acrylate, methyl methacrylate, ethyl methacrylate, n-propyl methacrylate, i-propyl methacrylate, n-butyl methacrylate, i-butyl methacrylate, sec-butyl methacrylate, t-butyl methacrylate, n-hexyl methacrylate, n-octyl methacrylate, 2-ethylhexyl methacrylate, n-decyl methacrylate, and n-dodecyl methacrylate.

These (meth)acrylate esters may have an optional substituent such as a hydroxyl group and a halogen atom. Examples of (meth)acrylate ester having such a substituent may include 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate, and 3-chloro-2 hydroxypropyl methacrylate.

The content of (meth)acrylate ester in the acrylic resin used in the present invention is 50% by weight or more, preferably 85% by weight or more, and more preferably 90% by weight or more. One species of (meth)acrylate ester may be used alone or two ore more species thereof may be used in combination. The molecular weight of the acrylic resin is not particularly limited, and is usually 50,000 to 500,000 in terms of weight average molecular weight. When its molecular weight is in this ranger a homogenous film can be easily made by a flow casting method.

The monomer copolymerizable with (meth)acrylate ester is not particularly limited, and examples thereof may include $\alpha,\beta$-ethylenic unsaturated carboxylic acid monomers, $\alpha,\beta$-ethylenic unsaturated carboxylate ester monomers other than (meth)acrylate alkanol ester and (meth)acrylate cycloalkanol ester, alkenyl aromatic monomers, conjugated diene monomers, non-conjugated diene monomers, cyanized vinyl monomers, unsaturated carboxylic acid amide monomers, carboxylate of unsaturated alcohol, and olefin monomers.

The $\alpha,\beta$-ethylenic unsaturated carboxylic acid monomer may be any of monocarboxylic acid, polyvalent carboxylic acid, partial ester of polyvalent carboxylic acid and polyvalent carboxylic acid anhydride. Specific examples thereof may include acrylic acid, methacrylic acid, crotonic acid, maleic acid, fumaric acid, itaconic acid, monoethyl maleate, mono-n-butyl fumarate, maleic acid anhydride and itaconic acid anhydride. Specific examples of the $\alpha,\beta$-ethylenic unsaturated carboxylate ester monomers other than (meth)acrylate alkanol ester and (meth)acrylate cycloalkanol ester may include glycidyl methacrylate, dimethyl fumarate, diethyl fumarate, dimethyl maleate, diethyl maleate and dimethyl itaconate. Specific examples of the alkenyl aromatic monomer may include styrene, $\alpha$-methylstyrene, methyl $\alpha$-methylstyrene, vinyl toluene and vinyl benzene.

Specific examples of the conjugated diene monomer may include 1,3-butadiene, 2 methyl-1,3-butadiene, 1,3-pentadiene, 2,3-dimethyl-1,3-butadiene, 2-chloro-1,3-butadiene and cyclopentadiene. Specific examples of the non-conjugated diene monomer may include 1,4-hexadiene, dicyclopentadiene and ethylidene norbornene.

Specific examples of the cyanized vinyl monomer may include acrylonitrile, methacrylonitrile, $\alpha$-chloroacrylonitrile and $\alpha$-ethylacrylonitrile.

Specific examples of the $\alpha,\beta$-ethylenic unsaturated carboxylic acid amide monomer may include acrylamide, methacrylamide, N-methylolacrylamide, N-methylolmethacrylamide and N-dimethylacrylamide. Specific examples of the carboxylate of unsaturated alcohol monomer may include vinyl acetate. Specific examples of the olefin monomer may include ethylene, propylene, butene and pentene.

The content of a unit based on the monomer copolymerizable with (meth)acrylate ester in the acrylic resin used in the present invention is 50% by weight or less, preferably 15% by weight or less and more preferably 10% by weight or less.

As to the monomer copolymerizable with (meth)acrylate ester, one species thereof may be used alone or two or more species thereof may be used in combination. As the monomer copolymerizable with (meth)acrylate ester, the alkenyl aromatic monomer is preferable, and styrene is particularly preferable.

Preferable examples of the acrylic resin used in the present invention may include methyl methacrylate/methyl acrylate/butyl acrylate/styrene copolymers and methyl methacrylate/methyl acrylate copolymers and methyl methacrylate/styrene/butyl acrylate copolymers.

In the acrylic resin used in the present invention, its value of break elongation is preferably in the range of 10 to 180% and more preferably 50 to 170%. When the break elongation is within the aforementioned range, a process of taking up the remainder of the brittle film is facilitated. When two or more species of the acrylic resins are used in combination, it is preferable that the break elongation of the mixture is within the aforementioned range.

In the present invention, the thickness of the surface layer composed of the aforementioned acrylic resin is preferably 10 μm or more and more preferably 20 to 60 μm. When the thickness of the surface layer is within the aforementioned range, sufficient surface pencil hardness and flexibility can be imparted to the first protection film.

In the present invention, the first protection film is composed of a plurality of thermoplastic resin layers as described above. It is preferable that this first protection film has an intermediate layer and surface layers provided on both surfaces of this intermediate layer, wherein, among the intermediate layer and the surface layers, at least the intermediate layer contains an ultraviolet light absorber, and a concentration of the ultraviolet light absorber in the intermediate layer is higher than those in the other layers. The intermediate layer may be a monolayer or a multilayer. The ultraviolet light absorber may be contained only in the intermediate layer.

In the present invention, the surface layer may also contain the ultraviolet light absorber. In that case, it is proper that the content is 0.1 to 5% by weight based on the total amount of the acrylic resin which composes the surface layer. More specifically, this content is determined by taking the content of the ultraviolet light absorber in the intermediate layer into account so as to assure an ultraviolet light transmission prevention performance required as the entire protection film. When the content is below a lower limit, an ultraviolet light absorption effect may not be obtained. When it exceeds an upper limit, the ultraviolet light absorber may leak out of the protection film.

The ultraviolet light absorber used in the present invention is not particularly limited, and it is possible to use those known publicly such as oxybenzophenone compounds, benzotriazole compounds, salicylate ester compounds, benzophenone based ultraviolet light absorbers, benzotriazole based ultraviolet light absorbers, acrylonitrile based ultraviolet light absorbers, triazine compounds, nickel complex salt compounds and inorganic powders. Among them, examples of suitable ultraviolet light absorber may include 2,2'-methylenebis[4-(1,1,3,3-tetramethylbutyl)-6-(2H-benzotriazole-2-yl)phenol], 2-(2-hydroxy-3'-tert-butyl-5'-methylphenyl)-5-chlorobenzotriazole, 2,4-di-tert-butyl-6-(5-chlorobenzotriazole-2-yl)phenol, 2,2-dihydroxy-4,4'-dimethoxybenzophenone and 2,2',4,4'-tetrahydroxybenzophenone. Among these, 2,2'-methylenebis[4-(1,1,3,3-tetramethylbutyl)-6-(2H-benzotriazole-2-yl)phenol] is particularly preferable.

Examples of the method for adding the aforementioned ultraviolet light absorber may include a method in which the ultraviolet light absorber is previously added to the thermoplastic resin; a method in which a master batch of the thermoplastic resin containing the ultraviolet light absorber at a high concentration is used; and a method in which the ultraviolet light absorber is directly supplied to a melted resin when the thermoplastic resin layer is molded by melting and extruding. Any of the methods may be employed.

The content of the ultraviolet light absorber contained in the thermoplastic resin layer is preferably 0.5 to 5% by weight based on 100% by weight of the resin. An unevenness of the concentration of the ultraviolet light absorbers in the aforementioned intermediate layers is desirably within ±0.1% in a whole area.

By adjusting the content of the ultraviolet light absorber to 0.5 to 5% by weight, it is possible to efficiently block the ultraviolet light without deteriorating a color tone of the polarization plate and prevent the reduction of polarization degree in the use for a long time. The content of the ultraviolet light absorber in the intermediate layer is more preferably 1.0 to 5% by weight.

When the content of the ultraviolet light absorber in the thermoplastic resin layer is less than 0.5% by weight, a light transmittance at wavelengths of 370 nm and 380 nm becomes large. If such a protection film is used, the polarization degree of the polarizer may be reduced. When the content of the ultraviolet light absorber exceeds 5% by weight, the light transmittance at a short wavelength side becomes small, and the laminate may have too thick yellowish color.

In the present invention, the unevenness of the concentrations of the ultraviolet light absorber in the thermoplastic resin layers which compose the first protection film is desirably within ±0.1% by weight in the whole area. By limiting the unevenness of the concentrations within this range, color tone unevenness of an initial film may be eliminated, the deterioration due to the ultraviolet light after the long term use occurs uniformly, and the color tone unevenness of the liquid crystal display device may be reduced. When the unevenness of the concentrations of the ultraviolet light absorber in the intermediate layers exceeds ±0.1% by weight in the whole area, the color tone unevenness may be apparently visible, and the color tone becomes poor. The unevenness also causes uneven deterioration due to the ultraviolet light after the long term use, which results in poorer color tone.

The aforementioned unevenness of the concentrations of the ultraviolet light absorber in the thermoplastic resin layers is measured by the following procedure.

First, an ultraviolet light transmittance of the laminate is measured using a spectrophotometer. Subsequently, the thickness of the laminate is measured using a contact thickness meter. Then, a cross section of a measured part is observed using an optical microscope to obtain a ratio of thickness of the surface layer with respect to the thickness of the intermediate layer, and thereby obtain the thickness of the intermediate layer. Then, the concentration of the ultraviolet light absorber is calculated from the ultraviolet light transmittance and the thickness using the following formula (1).

$$C = -\log_{10}(0.01T)/K/L \quad (1)$$

In the formula (1), C represents the concentration (% by weight) of the ultraviolet light absorber, T represents the light transmittance (%), K represents an absorption coefficient (−), and L represents the thickness of the laminate (μm).

The aforementioned manipulation is performed in a lengthwise direction and a crosswise direction with a constant interval in the laminate, and an arithmetic mean value of these measured values is calculated to obtain an average concentration $C_{ave}$. The maximum value and the minimum value of the measured concentration C are defined as $C_{max}$ and $C_{min}$, respectively, and the unevenness is calculated from the following formula.

Unevenness of concentrations(%)=larger one of $(C_{ave}-C_{min})/C_{ave} \times 100$ and $(C_{max}-C_{ave})/C_{ave} \times 100$.

Examples of the method for limiting the unevenness of the concentrations of the ultraviolet light absorber in the thermoplastic resin layers within ±0.1% by weight in the whole area may include the following: (1) The dried thermoplastic resin and the ultraviolet light absorber are mixed, then the mixture is placed in a hopper connected to an extruder, supplied to a uniaxial extruder, and melted and extruded. (2) The thermoplastic resin is charged in the hopper with a dryer, the ultraviolet light absorber is charged from another inlet, each of the thermoplastic resin and ultraviolet light absorber are weighed by a feeder and supplied to a biaxial extruder, and melted and extruded.

In the present invention, the thickness of the intermediate layer other than the outmost surface layer of the thermoplastic layers is preferably 10 to 40 Kim. When the thickness of the intermediate layer is less than 10 μm, an interlayer interface roughens and surface states such as flatness and smoothness are likely to worsen. When the thickness of the intermediate layer exceeds 40 μm, the entire polarization plate with such a polarization plate protection film becomes too thick, which makes its practical use difficult. As described later, the first protection film is used with a variety of optical function layers laminated on the surface of visual side. The total thickness of the protection film with such a variety of optical function layers laminated thereon is preferably 200 μm or less. This is because unnecessary thickening of the entire polarization plate is unpreferable as described above.

In the present invention, the unevenness of the thickness of the intermediate layer is preferably within ±1 μm in the whole area. By limiting the unevenness of the thickness of the intermediate layer within ±1 μm in the whole area, the color tone unevenness is also reduced. Also the color tone is uniformly changed after the long term use, and thus no color tone unevenness occurs after the long term use.

The thickness of the intermediate layer may be obtained as follows: the total thickness is measured using the commercially available contact thickness meter; the part whose thickness has been measured is cut out; the cross section thereof is observed using an optical microscope to obtain the ratio of the thickness of the intermediate layer with respect to the thickness of the surface layer; and the thickness of the intermediate layer is calculated from the ratio. The aforementioned manipulation is performed along the lengthwise direction and the crosswise direction with the constant interval on the laminate.

The unevenness of the thickness of the intermediate layer is calculated from the standard thickness $T_{ave}$ which the arithmetic mean value of these measured values, the maximum value $T_{max}$ and the minimum value $T_{min}$ of the measured values of the thickness T, using the following formula:

The unevenness of the thickness (μm)=the larger one of $T_{ave}-T_{min}$ and $T_{max}-T_{ave}$.

In the present invention, when the number of the layers which are the layers which compose the first protection film is k (k is an integer of 2 or more), an refractive index at the wavelength λ in the range of 380 to 780 nm of the thermoplastic resin layer at the i-th (i is an integer of k−1) from the location closest to the polarizer is $n_i(\lambda)$, and an refractive index at the wavelength λ in the range of 380 to 780 nm in the layer adjacent thereto is $n_{i+1}(\lambda)$, it is preferable that these satisfy the relationship of the following formula (2).

$$|n_i(\lambda)-n_{i+1}(\lambda)|\leq 0.05 \quad (2)$$

Particularly $|n_i(\lambda)-n_{i+1}(\lambda)|\leq 0.045$ is more preferable. $n_i(\lambda)$ and $n_{i+1}(\lambda)$ are the mean values of the principal refractive indices at the wavelength λ. When the value of $|n_i(\lambda)-n_{i+1}(\lambda)|$ exceeds the aforementioned value, it is likely that interference fringes occur on the surface of the protection layer due to interface reflection caused by the difference of the refractive indices on the interface.

In the present invention, one or more of other additives other than the ultraviolet light absorber may be contained in any layers of the thermoplastic layers. The aforementioned other additives are not particularly limited, and examples thereof may include inorganic fine particles; stabilizers such as antioxidants, thermal stabilizers and infrared light absorbers; resin modifiers such as lubricants and plasticizers; coloring agents such as dyes and pigments, and antistatic agents. One species of the additives may be used alone or two or more species thereof may be used in combination. The amount for adding the additives may be appropriately selected in the range in which the object of the present invention is not impaired.

Examples of the lubricants may include particles of inorganic substances such as silicon dioxide, titanium dioxide, magnesium oxide, calcium carbonate, magnesium carbonate, barium sulfate and strontium sulfate, and particles of organic substances such as polymethyl acrylate, polymethyl methacrylate, polyacrylonitrile, polystyrene, cellulose acetate and cellulose acetate propionate. As the particle which composes the lubricant, the organic particle is preferable, and among them, the particle made of polymethyl methacrylate is particularly preferable.

In the present invention, any layers of the thermoplastic resin layers can contain an elastic particle composed of a rubbery elastic material as the lubricant or for another purpose. Preferably, it is preferable that the elastic particle is contained in any one or more of layers in the protection film having the intermediate layer and the surface layers on both sides thereof. Furthermore, it is preferable that the layer contains the acrylic resin as the thermoplastic resin and contains the elastic particle as well, for enhancing an impact resistance and the flexibility.

Examples of the material of the rubbery elastic material may include acrylate ester rubbery polymers, rubbery polymers composed mainly of butadiene, and ethylene/vinyl acetate copolymers. As the acrylate ester rubbery polymer, those composed mainly of butyl acrylate or 2-ethylhexyl acrylate are available. Among them, the acrylate ester polymer composed mainly of butyl acrylate and the rubbery polymer composed mainly of butadiene are preferable. The elastic particle may be a layered particle of two species of polymers, and a representative example thereof may be an elastic particle having a grafted rubber elastic part containing alkyl acrylate such as butyl acrylate and styrene, and also having a hard resin layer composed of a copolymer of methyl methacrylate and/or methyl methacrylate and alkyl acrylate, forming layers in a core-shell structure.

The number average particle diameter of the elastic particles in a state of being dispersed in the thermoplastic resin is usually 2.0 μm or less, preferably 0.1 to 1.0 μm and more preferably 0.1 to 0.5 μm. Here, when primary particles are aggregated to form larger secondary particles, the "number average particle diameter" is preferably the diameter of the secondary particles. Even when the primary particle diameter of the elastic particle is small, if the number average particle diameter of the secondary particle formed by aggregation is large, the protection film for the polarization plate has a high haze and the low light transmittance, and thus becomes unsuitable for display screens. When the number average particle diameter is too small, the flexibility tends to be reduced.

In the present invention, it is preferable that the relationship of the formula (3) is satisfied between the refractive index $n_p(\lambda)$ at the wavelength of 380 to 780 nm of the elastic particle and the refractive index $n_r(\lambda)$ at the wavelength of 380 to 780 nm of the thermoplastic resin which becomes a matrix.

$$|n_p(\lambda)-n_r(\lambda)|\leq 0.05 \quad (3)$$

Particularly $|n_p(\lambda)-n_r(\lambda)|\leq 0.045$ is more preferable. $n_p(\lambda)$ and $n_r(\lambda)$ are the mean values of the principal refractive indices at the wavelength λ. When the value of $|n_p(\lambda)-n_r(\lambda)|$ exceeds the aforementioned value, it is likely that the transparency is impaired due to the interface reflection caused by the difference of the refractive indices on the interface.

A preferable photoelastic coefficient of the protection film in the present invention is, as an absolute value, preferably $30\times10^{-13}$ cm$^2$/dyn or less (i.e., $-20\times10^{-13}$ cm$^2$/dyn to $20\times10^{-13}$ cm$^2$/dyn), more preferably $10\times10^{-13}$ cm$^2$/dyn or less and still more preferably $5\times10^{-13}$ cm$^2$/dyn or less. The photoelastic coefficient larger than this value may tend to cause phase difference upon protecting the polarizer due to a shrinkage stress of the polarizer, which lead to reduction of the optical property of the polarization plate. The protection film preferably has a small in-plane phase difference Re [which is a value defined by Re=d×($n_x-n_y$) wherein $n_x$ and $n_y$ represent an in-plane principal refractive indices of the protection film and d represents the average thickness of the protection film]. Specifically the in plane phase difference Re at the wavelength of 550 nm is preferably 50 nm or less, more preferably 10 nm or less and still more preferably 5 nm or less. This suitable range of the phase difference is the same as that for the phase difference Rth in a thickness direction of the protection film. The phase difference Rth in the thickness direction can be calculated from the aforementioned $n_x$, $n_y$, the refractive index along the direction of thickness $n_z$, and the aforementioned thickness d (nm) with the equation Rth=$[\{(n_x+n_y)/2\}-n_z]\times d$.

When the Re exceeds 10 nm, in-plane slow axis of the entire protection film must be conformed to transmission axis or absorption axis of the polarizer, and if they are not conformed, it is likely to cause light leakage.

The in-plane phase difference Re and the phase difference in the thickness direction Rth in the protection film can be measured using a commercially available automatic birefringent meter.

In the present invention, as the method for obtaining the laminated film (also referred to as a substrate film) which composes the protection film, it is possible to appropriately utilize publicly known methods e.g., molding methods by coextrusion such as a coextrusion T-die method, a coextrusion inflation method and a coextrusion lamination method, and a film lamination molding method such as a dry lamination, as well as a coating molding method in which a resin solution which composes the surface layer is coated onto the film which composes the intermediate layer. Among them, the molding method by the coextrusion is preferable in terms of production efficiency and not leaving volatile components such as solvents in the film.

Among the coextrusion methods, the coextrusion T-die method is preferable. Examples of the coextrusion T-die method may include a feed block system and a multi-manifold system, and the multi-manifold system is more preferable in terms of reducing the unevenness of the thickness of the intermediate layers.

When the coextrusion T die method is employed as the method for obtaining the substrate film, the melting temperature of the thermoplastic resin in an extruder having a T-die is preferably 80 to 180° C. higher and more preferably 100 to 150° C. higher than the glass transition temperature (Tg) of this thermoplastic resin. When the melting temperature in the extruder is excessively low, the fluidity of the thermoplastic resin is likely to be insufficient, whereas, when the melting temperature is excessively high, the resin is likely to be deteriorated.

In the present invention, in order to limit the unevenness of the thickness of the intermediate layer within ±1 μm in the whole area as described above, it is necessary to perform all of the followings: (1) a polymer filter having a screen aperture of 20 μm or less is provided in the extruder; (2) a gear pump is rotated at 5 rpm or more; (3) an enclosure unit is disposed around a die; (4) an air gap is adjusted to 200 mm or less; (5) an edge pinning is performed when the film is cast on a cooling roll; and (6) the biaxial extruder or the uniaxial extruder having a double flight type in a screw format is used as the extruder. If even one of the aforementioned (1) to (6) is not performed, it is difficult to limit the unevenness of the thickness of the intermediate layer within ±1 μm in the whole area.

An extruding temperature can be appropriately selected depending on the thermoplastic resin to be used. It is preferable that the temperature is Tg to (Tg+100)° C. at an entrance of the resin and (Tg+50) to (Tg+170)° C. at an exit of the resin in the extruder. A die temperature is preferably (Tg+50) to (Tg+170)° C. Tg herein represents the glass transition temperature of the resin to be extruded.

When the melting extrusion method is used as the method for obtaining the laminated film (substrate film), a sheet shaped melted resin extruded from an opening of the die is adhered to a cooling drum. The method for adhering the melted resin to the cooling drum is not particularly limited, and examples thereof may include an air knife system, a vacuum box system and an electrostatic adhesion system.

The number of the cooling drums is not particularly limited, and is usually two or more. Examples of arrangement of the cooling drums may include, but is not particularly limited to, a straight line type, a Z type and an L type. The manner for passing the melted resin extruded from the opening of the die through the cooling drum is not particularly limited.

In the present invention, the degree of adhesion of the sheet-shaped melted resin extruded to the cooling drum may be altered by the temperature of the cooling drum. When the temperature of the cooling drum is raised, the resin is adhered well. However, if the temperature is excessively raised, it is likely that the sheet-shaped thermoplastic resin is not peeled from the cooing drum to cause a problem, e.g., the resin may be wound up around the drum. Thus, the temperature of the cooling drum is preferably (Tg+30)° C. or below and more preferably (Tg−5) to (Tg−45)° C. when the glass transition temperature of the thermoplastic resin extruded from the die is Tg (° C.). Adjustment of temperature in such a manner prevents the problems such as slippage and scarring.

In the method for producing the first protection film in the present invention, it is important to reduce the content of a residual solvent. Examples of the procedures therefor may include: (1) reducing the residual solvent in the thermoplastic resin itself; and (2) pre-drying the thermoplastic resin before forming the film. The pre-drying is performed by forming a raw material into a pellet form and using a hot air dryer. The drying temperature is preferably 100° C. or higher, and a drying time period is preferably two hours or more. By the pre-drying, it is possible to reduce the content of the residual solvent in the substrate film and to avoid foams in the extruded thermoplastic resin.

In the present invention, the lamination of the films may also be achieved by using an adhesive, as an alternative for the aforementioned coextrusion method. Examples of the adhesive may include acrylic adhesives, urethane adhesives, polyester adhesives, polyvinyl alcohol adhesives, polyolefin adhesives, modified polyolefin adhesives, polyvinyl alkyl ether adhesives, rubber adhesives, vinyl chloride vinyl acetate adhesives, ethylene based adhesives such as SEBS (styrene-ethylene-butylene-styrene copolymer) adhesives and ethylene-styrene copolymers, and acrylate ester based adhesives such as ethylene-methyl (meth)acrylate copolymers and ethylene-ethyl (meth)acrylate copolymers.

By laminating the surface layers on the both surfaces of the intermediate layer using such an adhesive keeping elasticity, flexibility of the laminated substrate film may be improved, which lead to improvement in cutting property upon punching out the substrate film into a size suitable for products. This adhesive layer acts as a stress buffering layer which relaxes the stress caused when an external force is given to the product when the protection film is used as a product. Thus, it can further enhance the protection property of the protection film.

The average thickness of this adhesive layer is usually 0.01 to 30 μm and preferably 0.1 to 15 μm. This adhesive layer has a tensile breaking strength of 40 MPa according to JIS K 7113.

It is preferable that the surface of the substrate film which composes the first protection film in the present invention, i.e., the surface of the surface layer composed of the acrylic resin (surface opposite to the polarizer of the polarization plate) substantially has neither irregular linear concave nor convex portion thereon and is thus flat. "Substantially" having nothing means that, even if the linear concave and convex portions are formed, the linear concave portion has a depth of less than 50 nm and a width of more than 500 nm, and the linear convex portion has a height of less than 50 nm and the width of more than 500 nm More preferably the depth of the concave is less than 30 nm and the width thereof is 700 nm and the height of the convex is less than 30 nm and the width thereof is more than 700 nm. By such a constitution, it is possible to prevent the occurrence of light interference and light leakage due to light refraction at the linear concave and convex portions, to thereby enhance the optical performance. "Irregular" occurrence means that the unevenness is formed at unintended positions and in unintended sizes.

The depth of the linear concave portions the height of the linear convex portion and their width can be obtained as follows. The substrate film is irradiated with light and the transmitted light is projected on a screen. A square of 30 mm corresponding to the portion of the film having light or dark stripes (this portion has the large depth and height of the unevenness) of the light which appears on the screen is cut out. The surface of the cut-out film piece is observed using a three dimensional surface structure analysis microscope (visual field area: 5 mm×7 mm). The observed image is converted into a three dimensional image, and a cross-sectional profile in an MD direction is obtained from this three dimensional image. The cross-sectional profile is obtained in the visual field area with an interval of 1 mm. A mean line is drawn on this cross sectional profile. The length from this mean line to the bottom of the concave portion is the depth of the concave portion and the length from this mean line to the top of the convex portion is the height of the convex portion. The distance between the mean line and an intersection point with the profile is the width. Maximum values are obtained from the measurement values of the depth and the height, and the width of the concave or convex portion exhibiting the maximum value is obtained. The maximum values of the depth and the height and the width of the concave or convex portion exhibiting the maximum value obtained in the aforementioned manner are taken as the depth of the concave portion, the height of the convex portion and their width in the film.

In the present invention, the complete protection film may be provided with an optical function layer on one surface layer (layer at the location most distant from the polarizer; surface opposite to the polarizer) of the substrate film which composes the first protection film. Examples of the optical function layer may include a hard coat layer, an anti-reflection layer, an antifouling layer, a gas barrier layer, a transparent antistatic layer, a primer layer, electromagnetic wave blocking layer and an undercoating layer. One or more layers of them may be provided on the surface layer.

The hard coat layer may preferably be those having a hardness of "1H" or harder in a pencil hardness test (a test plate is a glass plate) according to JIS K5600-5-4. The hard coat layer may preferably be formed of thermosetting or photocurable materials. It is preferable that the pencil hardness of the first protection film which is provided with such a hard coat layer is 4H or harder. It is possible that the pencil hardness of the first protection film in the present invention is adjusted to 4H or harder because the surface layer of its substrate film is composed of the acrylic resin. Examples of the materials for the hard coat layer may include organic hard coat materials such as organic silicone, melamine, epoxy, acryl and urethane acrylate materials, and inorganic hard coat materials such as silicon dioxide. Among them, it is preferable to use the urethane acrylate based material and multifunctional acrylate based material because they have a good adhesive force and are therefore advantageous in terms of productivity.

It is preferable that the refractive index $n_H$ of this hard coat layer has a relationship $n_H \geq 1.53$ and $n_H^{1/2} - 0.2 < n_L < n_H^{1/2} + 0.2$ with the refractive index $n_L$ of a low refractive index layer laminated thereon, for exhibiting an anti-reflection function. The hard coat protection film laminated with such a hard coat layer preferably has a haze value of 1.0 or less when measured according to JIS K7105 and using a haze meter.

If desired, the hard coat layer may contain a variety of fillers for the purpose of adjusting the refractive index, enhancing a bending elastic modulus, stabilizing a volume shrinkage rate, and enhancing a heat resistance, antistatic property and an antiglare property. It is also possible to add various additives such as antioxidants, ultraviolet light absorbers, light stabilizers, antistatic agents, leveling agents and anti-foaming agents.

Examples of the filler for adjusting the refractive index and the antistatic property of the hard coat layer may include titanium oxide, zirconium oxide, zinc oxide, tin oxide, cerium oxide, antimony pentaoxide, tin-doped indium oxide (ITO), antimony-doped tin oxide (ATO), aluminium-doped zinc oxide (AZO) and fluorine-doped tin oxide (FTO). Preferable filler may be antimony pentaoxide, ITO, ATO and FTO in terms of keeping transparency. The refractive index of the filler is preferably 1.6 or more. It is preferable to use the filler having the refractive index in the aforementioned range, since thereby the hard coat layer can also have a function of a high refractive index layer which will be described later, which lead to simplification of the process. The primary particle diameters of these fillers are usually 1 nm or more and 100 nm or less and preferably 1 nm or more and 30 nm or less.

It is preferable that the first protection film further have an anti-reflection layer laminated on the hard coat layer. The anti-reflection layer is a layer for avoiding reflection image caused by an outside light. As to the hard coat protection film laminated with such an anti reflection layer, it is preferable that a reflectance of the light having an incident angle of 5° at 430 to 700 nm is 2.0% or less and the reflectance at 550 nm is 1.0% or less. The thickness of the anti-reflection layer is preferably 0.01 to 1 μm and more preferably 0.02 to 0.5 μm. Examples of such an anti-reflection layer may include a layer obtained by laminating a low refractive index layer having a refractive index lower than that that of the hard coat layer, preferably the refractive index of 1.30 to 1.45; and a layer obtained by repeatedly laminating a low refractive index layer composed of an inorganic compound and a high refractive index layer composed of an inorganic compound.

The material which forms the low refractive index layer is not particularly limited as long as it has lower refractive index than the substrate and the hard coat layer, and examples thereof may include resin based materials such as ultraviolet-curable acrylic resins, hybrid materials obtained by dispersing organic microparticles of colloidal silica in a resin, and sol-gel materials of metal alkoxide such as tetraethoxysilane. The material for forming the low refractive index materials exemplified above may be already-polymerized polymers, or monomers or oligomer precursors. It is preferable that each material contains a fluorine-containing compound for imparting an antifouling property on the surface.

As the fluorine-containing sol-gel material, it is possible to exemplify fluoroalkyl alkoxysilane. Examples of fluoroalkyl alkoxysilane may include compounds represented by the general formulae (4): $CF_3(CF_2)_n CH_2CH_2Si(OR)_3$ (R represents an alkyl group having 1 to 5 carbon atoms and n represents an integer of 0 to 12). Specific examples thereof may include trifluoropropyl trimethoxysilane, trifluoropropyl triethoxysilane, tridecafluorooctyl trimethoxysilane, tridecafluorooctyl triethoxysilane, heptadecafluorodecyl trimethoxysilane, and heptadecafluorodecyl triethoxysilane. Among them, the compounds wherein aforementioned n is 2 to 6 are preferable.

It is preferable that the low refractive index layer is composed of a cured product of a thermosetting fluorine compound or an ionization radiation-curable fluorine compound. The dynamic friction coefficient of the cured product is preferably 0.03 and 0.15 and the contact angle of the product against water is preferably 90 to 120 degrees. Examples of curable fluorine-containing polymer compounds may include fluoroalkyl group-containing silane compounds [e.g., (heptadecafluoro-1,1,2,2-tetradecyl) triethoxysilane], and fluorine-containing copolymers having a crosslinkable functional group.

This fluorine-containing polymer is obtainable by copolymerizing a fluorine-containing monomer with a monomer having a crosslinkable functional group, or copolymerizing a fluorine-containing monomer with a monomer having a functional group and then adding a compound having a crosslinkable functional group to the functional group in the polymer.

Specific examples of the fluorine containing monomer may include fluoroolefins (e.g., fluoroethylene, vinylidene fluoride r tetrafluoroethylene, hexafluoroethylene, hexafluoropropylene, perfluoro-2,2-dimethyl-1,3-dioxole), a partially or completely fluorinated alkyl ester derivative of (meth) acrylic acid (e.g., Biscoat GFM supplied from Osaka Organic Chemical industry Ltd., and M-2020 supplied from Daikin Industries, Ltd.), and completely or partially fluorinated vinyl ethers. Examples of the monomer having the crosslinkable functional group or the compound having the crosslinkable functional group may include (meth)acrylate monomers such as glycidyl methacrylate previously having the crosslinkable functional group in the molecule, as well as (meth)acrylate monomers having carboxyl, hydroxyl, amino or sulfonic acid group (e.g., (meth)acrylic acid, methylol (meth)acrylate, hydroxyalkyl (meth)acrylate, ally acrylate).

A sol obtained by dispersing fine particles of silica, alumina, titania, zirconia or magnesium fluoride in an alcohol solvent may be added to a composition used for forming the low refractive index layer for the purpose of imparting the scratch resistance. In terms of anti-reflection, the fine particles preferably have a low refractive index. The fine particle may have voids. It is preferable to use silica based hollow fine particles.

The average particle diameter of the hollow fine particles is not particularly limited, and is preferably 5 to 2,000 nm and more preferably 20 to 100 nm. The average particle diameter here is the number average particle diameter obtained by observing with a transmission electron microscope.

Increasing the ratio of the fluorine-containing resin in the composition which composes the low refractive index layer may cause deterioration of the scratch resistance of the low refractive index layer. Thus, by optimizing the ratio of the fluorine-containing resin and the amount of the fine particles to be added, it is possible to find the best point for balancing the scratch resistance and the low refractive index. The silica fine particle preparation for addition may be a silica sol dispersed in a commercially available organic solvent which is to be added to the composition for application, or a dispersant of commercially available silica powders in an organic solvent.

The method for forming the low refractive index layer is not particularly limited, but a wet coating method is simpler and more preferable than a vacuum deposition method.

Examples of the method for forming the low refractive index layer by the coating method may include a dip coating method, an air knife coating method, a curtain coating method, a roller coating method, a wire bar coating method, and a gravure coating method.

The thickness of the low refractive index layer is not particularly limited, and is preferably about 0.05 to 0.3 μm and particularly preferably 0.1 to 0.3 μm.

An antifouling layer may be provided on the low refractive index layer (observation side) for enhancing the antifouling property of the low refractive index layer in the first protection film. The antifouling layer is the layer which can impart a water-repellent property, an oil-repellent property, a perspiration resistance and the antifouling property to the surface of the protection film. As the material used for forming the antifouling layer, fluorine-containing organic compounds are suitable. Examples of the fluorine-containing organic compounds may include fluorocarbon, perfluorosilane and polymers thereof. For forming the antifouling layer, physical vapor phase growth methods such as deposition and sputtering, chemical vapor phase growth methods such as CVD, and wet coating methods may be used depending on the material to be coated. The average thickness of the antifouling layer is preferably 1 to 50 nm and more preferably 3 to 35 nm.

When the optical function layer is formed on the substrate film, a hydrophilization treatment may be given to the surface of the substrate film. The hydrophilization treatment is not particularly limited, and a surface treatment method such as a corona discharge treatment, a sputtering treatment, a low pressure UV irradiation and a plasma treatment may be suitably employed. In addition to the hydrophilization treatment, the surface of the first protection film may be subjected to a mechanical treatment using, e.g., etching, sandblast or emboss roll, to form an uneven region for the purpose of reinforcing the adhesiveness to the optical function layer and imparting the antiglare property. This uneven region is a region having an intentionally-formed, approximately regular unevenness which is different from the aforementioned linear concave and convex portions. It is also possible to give a treatment for improving adhesiveness such as application of a thin layer of a cellulose based material or a polyester based material.

The total number of the laminated layers of the thermoplastic resin layers which compose the first protection film is preferably 7 or less and more preferably 5 or less. When the number of the laminated layers is further increased, control of the properties and thickness of each layer may become difficult.

The moisture permeability of the first protection film is preferably 10 g/m$^2$·24 hours or more and 200 g/m$^2$·24 hours or less. When the moisture permeability is less than 10 g/m$^2$·24 hours, removal of the moisture contained in the polarizer may become insufficient in the step of attaching the protection film with the polarizer, which may cause decrease in adhesiveness between the polarizer and the protection film under the high temperature and high humidity environment. When the moisture permeability exceeds 200 g/m$^2$·24 hours, moisture absorption and moisture removal may cause to a large extent as the temperature changes, which may cause decrease in a size accuracy of the film, and the deterioration of the optical property of the polarization plate. Such a suitable range of the moisture permeability may be achieved by selecting a type and a film thickness of the resin.

This moisture permeability can be measured under a test condition of leaving stand under the environment at 40° C. and 92% RH for 24 hours in accordance with a cup method described in JIS Z0208.

Subsequently, the second protection film which composes the polarization plate of the present invention will be described. The second protection film is a film wherein (i) its photoelastic coefficient is $20 \times 10^{-13}$ cm$^2$/dyn or less, or (ii) it has a biaxial property, or (iii) the ratio Re (450)/Re (550), which is a ratio of a retardation value Re (450) measured at the wavelength of 450 nm relative to a retardation value Re (550) measured at the wavelength of 550 nm, is 1.007 or less.

The second protection film may be the same as or may be different from the first protection film. In the polarization plate of the present invention, the second protection film fulfills one or more, preferably two or more of the aforementioned requirements. Specifically, for example, the second protection film may be a film having the aforementioned requirements (i) and (ii), a film having the aforementioned requirements (i) and (iii), a film having the aforementioned requirements (ii) and (iii), or a film having the aforementioned requirements (i) to (iii). It is more preferable that the first protection film likewise fulfills one or more of the aforementioned requirements (i) to (iii).

As to the aforementioned requirement (i), the preferable range of the photoelastic coefficient is $10 \times 10^{-13}$ cm²/dyn or less and more preferably $5 \times 10^{-13}$ cm²/dyn or less. When the photoelastic coefficient is larger than the aforementioned value, the phase difference may easily appear in the protection film due to the shrinkage stress of the polarizer to which the protection film is attached, to reduce the optical performance of the polarization plate.

As a method for giving the aforementioned photoelastic coefficient to the first protection film composed of the aforementioned plurality of layers of the laminated films (substrate films), there is a method of laminating the layers composed of the resins having a positive photoelastic coefficient and the layers composed of the resins having a negative photoelastic coefficient. As a method for setting the in-plane direction retardation, there is a method of setting the slow axis in each layer which composes the first protection film so that the retardation value in the in-plane direction is offset.

It is possible to constitute the second protection film in a different manner from the constitution of the plurality of layers of the first protection film. The materials therefor are not particularly limited, and the materials known publicly in the prior art may be used. However, it is preferable to us the materials which are excellent in transparency, mechanical strength and heat stability. As to the transparency, the light transmittance of the sample having thickness of 1 mm in the visible region of 400 to 700 nm is preferably 80% or more, more preferably 85% or more and still more preferably 90% or more.

Specific examples of the materials may include thermoplastic resins such as polycarbonate resins, polyether sulfone resins, polyethylene terephthalate resins, polyimide resins, polymethyl methacrylate resins, polysulfone resins, polyarylate resins, polyethylene resins, polyvinyl chloride resins, diacetyl cellulose, triacetyl cellulose (TAC) and alicyclic olefin polymers (COP). Acrylic, urethane, acryl urethane, epoxy and silicone based thermosetting resins and ultraviolet light curable resins may also be enumerated.

The alicyclic olefin polymers may be those such as cyclic olefin random multicomponent copolymers described in JP Hei-05-310845-A, hydrogenated polymers described in JP Hei-05-97978 and thermoplastic dicyclopentadiene based ring-opening polymers described in JP Hei-11-124429-A, and hydrogenated products thereof.

If necessary, the thermoplastic resin may contain additives such as the coloring agents such as pigments and dyes, and fluorescent brightening agents, dispersants, heat stabilizers, photo stabilizers, ultraviolet light absorbers, antistatic agents, antioxidants, lubricants and solvents.

Among them, polymethyl methacrylate resins, alicyclic olefin polymers and cellulose ester are preferable in terms of excellent transparency.

The method for forming this second protection film is not limited, and the second protection film is obtainable by forming a film from the materials enumerated in the aforementioned exemplification using the publicly known molding method.

As this second protection film, a film having a birefringent property may be used for the purpose of widening a view angle. The film having the birefringent property refers to a film which has a function of optical compensation such as color compensation and view angle compensation, and has an effect of enhancing the visibility of the liquid crystal display device, and whose birefringent property is controlled in a width direction and a longitudinal direction. Examples thereof may include a film having a uniaxial property, a film having a biaxial property, and laminated bodies thereof, from which the appropriate film is suitably selected depending on a mode of a liquid crystal cell to be used. Having the uniaxial property means that, when the refractive index in an in-plane slow axis direction in the film is n, the refractive index in the in-plane direction orthogonal to the in-plane slow axis is $n_y$, and the refractive index in the thickness direction is $n_z$, any one of the refractive indices is different. Examples thereof may include the film having a relationship of $n_x > n_y = n_z$ (positive A plate), $n_x = n_y > n_z$ (negative C plate) $n_x < n_y = n_z$ (negative A plate), $n_x = n_y < n_z$ (positive C plate). The film having the biaxial property means that all of the aforementioned refractive indices in the three directions are different, and examples thereof may include films having the relationship of $n_x > n_y > n_z$, or $n_x < n_y < n_z$. Since the film having the biaxial property satisfies the aforementioned requirement (ii), it may be used as the second protection film for the polarization film of the present invention, even if the aforementioned requirements (i) and (iii) are not satisfied.

The retardation Re in the in-plane direction and the retardation Rth in the thickness direction of the film having the birefringent property are suitably adjusted depending on the mode of the liquid crystal cell to be used, and Re and Rth of the protection film on the cell side in another polarization plate on the other side of the cell The retardation Re in the in-plane direction and the retardation Rth in the thickness direction are the values represented by $Re=(n_x-n_y) \times d$ and $Rth=((n_x+n_y)/2-n_z) \times d$ wherein the principal in-plane refractive indices of the film are $n_x$ and $n_y$, the refractive index in the thickness direction is $n_z$ and the thickness of the film is d (nm).

In the polarization plate of the present invention, when the ratio Re (450)/Re (550) which is the ratio of a retardation value measured at the wavelength of 450 nm Re (450) relative to a retardation value measured at the wavelength of 550 nm Re (550) is 1.007 or less in the second protection film, the film satisfies the aforementioned requirement (iii). Thus, even if the aforementioned requirements (i) and (ii) are not satisfied, the film may be used as the second protection film for the polarization plate of the present invention. When this ratio Re (450)/Re (550) exceeds 1.007, the anti-reflection property may become insufficient when the polarization plate is used in the display devices such as reflection type/transreflective type liquid crystal display devices and touch panels which require the good anti-reflection property.

As the aforementioned birefringent film, those obtained by elongation of a film containing the thermoplastic resin, those obtained by forming an optical anisotropy layer on a non-elongated thermoplastic resin, and those obtained forming the optical anisotropy layer on the film containing the thermoplastic resin followed by elongation may be used. The elongated film may be in a monolayer form or a multilayer form.

As the aforementioned thermoplastic resin, it is preferable to employ a resin having excellent transparency, mechanical strength and heat stability. As to the transparency, the light transmittance of the visible light at 400 to 700 nm when the resin is formed into the film having the thickness of 1 mm is preferably 80% or more, more preferably 85% or more and still more preferably 90% or more.

The aforementioned thermoplastic resin may be selected from exemplifications of the thermoplastic resins described as the materials for the second protection film. Among them, alicyclic olefin polymers and cellulose ester are preferable because of excellent transparency and low birefringent property.

As the aforementioned cellulose ester, those having a substitution degree of acyl group of 2.5 to 2.9 determined in accordance with ASTM D-817-96 may be preferably used. Examples of the acyl group may include acetyl, propionyl and butyryl groups. A mixture obtained by mixing cellulose esters having different substituents, e.g., cellulose acetate propionate may be preferably used in the present invention. Particularly, cellulose ester containing acetyl groups and propionyl groups so as to satisfy the following formulae (5) and (6) is preferable:

$$2.5 < (A+B) < 2.9 \tag{5}$$

$$1.5 < A < 2.9 \tag{B}$$

wherein A is the substitution degree of the acetyl group and B is the substitution degree of the propionyl group.

If necessary, the aforementioned thermoplastic resin A may contain retardation elevating agent. The retardation elevating agent is a compound which gives higher retardation to the thermoplastic resin, than the resin without the compound. When the retardation elevating agent is added to cellulose ester, the amount thereof is preferably 0.01 to 20 parts by weight, more preferably 0.1 to 10 parts by weight, still more preferably 0.2 to 5 parts by weight and most preferably 0.5 to 2 parts by weight based on 100 parts by weight of cellulose ester. Two or more species of the retardation elevating agents may be used in combination. It is preferable that the retardation elevating agent has the maximum absorbance in the wavelength region of 250 to 400 nm. It is preferable that the retardation elevating agent substantially has no absorbance in the visible region.

As the aforementioned retardation elevating agent, it is preferable to use a compound having at least two aromatic rings. Examples of the "aromatic ring" herein may include aromatic hetero rings in addition to aromatic hydrocarbon rings. The aromatic hydrocarbon ring is preferably a 6-membered ring (i.e., benzene ring). The aromatic hetero ring is generally an unsaturated hetero ring. The aromatic hetero rings are preferably 5-membered rings, 6-membered rings, or 7-membered rings, and more preferably 5-membered rings and 6-membered rings. The aromatic hetero ring generally has the maximum possible double bonds. As the heteroatom, a nitrogen atom, an oxygen atom and a sulfur atom are preferable, and the nitrogen atom is particularly preferable. Examples of the aromatic hetero rings may include furan rings, thiophene rings, pyrrol rings, oxazole rings, isoxazole rings, thiazole rings, isothiazole rings, imidazole rings, pyrazole rings, furazane rings, triazole rings, pyran rings, pyridine rings, pyridazine rings, pyrimidine rings, pyrazine rings, and 1,3,5-triazine rings. As the aromatic rings, benzene rings, furan rings, thiophene rings, pyrrol rings, oxazole rings, thiazole rings, imidazole rings, triazole rings, pyridine rings, pyrimidine rings, pyrazine rings, and 1,3,5-triazine rings are preferable.

The number of the aromatic rings which the aforementioned retardation elevating agent has is preferably 2 to 20, more preferably 2 to 12, still more preferably 2 to 8 and the most preferably 2 to 6. The types of the bond between two aromatic rings may be classified into (a) the case of forming a condensed ring, (b) the case of being directly bound by a single bond and (c) the case of being bound via a linking group (because of being the aromatic rings, a spiro bond can not be formed). The bond may be any of (a) to (c).

Examples of the method for elongation of the film containing the thermoplastic resin may include a uniaxial elongation method, e.g., the method in which the uniaxial elongation is performed in a crosswise direction using a tenter; a biaxial elongation method, e.g., a simultaneous biaxial elongation in which elongation in a lengthwise direction by increased intervals of holding clips is performed simultaneously with elongation in crosswise direction by the spreading angle of guide rails, and a sequential biaxial elongation in which elongation in a lengthwise direction utilizing the difference of peripheral velocities between rolls is performed and then elongation in a crosswise direction using a tenter is performed with holding its both ends with the clips; and the methods of elongation in an oblique direction using a tenter elongation machine capable of adding a sending force, a pulling force or a taking up force in the crosswise direction and the lengthwise direction with different speeds at right and left side, or using a tenter elongation machine capable of adding a sending force, a pulling force or a taking up force in the crosswise direction or the lengthwise direction with the same speed at right and left side so as to have a fixed elongation angle $\theta$ with the same moving distances or so as to have different moving distances.

The elongation temperature is usually in the range of Tg to Tg+20° C. wherein Tg is the glass transition temperature of the materials constituting the second protection film. Particularly, Tg is the glass transition temperature of the resin in the resin materials having the lowest glass transition temperature. The elongation ratio may be adjusted usually within the range of 1.1 to 3.0 times for obtaining the desired optical property.

A polymer compound and a liquid crystal compound may be used for forming the optical anisotropy layer (optical compensation layer). These may be used alone or in combination.

As the aforementioned polymer compound, polyamide, polyimide, polyester and polyether ketone may be used. Specifically, examples thereof may include the compounds described in JP Hei-8-511812 A (International Publication No. WO94/24191) and JP 2000-511296 A (International Publication No. WO97/44704).

The aforementioned liquid crystal compounds may be any of rod-shaped liquid crystal molecules and discotic liquid crystal molecules, may be any of high molecular crystals and low molecular crystals, and low molecular liquid crystals which are crosslinked and lost liquid crystallinity. Preferable examples of the rod shaped liquid crystals may include those described in JP 2000-304932-A. Preferable examples of the discotic liquid crystal may include those described in JP Hei 8-50206-A.

In general, the optical anisotropy layer is obtainable by preparing a solution which has been prepared by dissolving a discotic compound and other compounds (e.g., plasticizer, surfactant, and a polymer) in a solvent, applying the solution on an orientation film which has been formed on the thermoplastic film, drying, then heating up to a discotic nematic phase formation temperature, and subsequently cooling with keeping an orientation state (discotic nematic phase). Alternatively, the optical anisotropy layer is obtainable by preparing a solution which has been prepared by dissolving a discotic compound and other compounds (further, e.g., polymerizable monomer, photopolymerization initiator) in a solvent, applying the solution on a orientation film, drying, then heating up to a discotic nematic phase formation temperature, subsequently polymerizing by irradiating UV light, and further cooling. The orientation state may be appropriately adjusted depending on the mode of the liquid crystal to be used. For example, when the liquid crystal cell is in an in-plane orientation mode (IPS: in-plane switching), orientation in a substantially perpendicular state with respect to the substrate is preferable. When the liquid crystal cell is in a bend orientation mode (OCB: optical compensated bend) or a twisted orientation mode (TN: twisted nematic), preferably the optical axis is in a state of a hybrid orientation along the film thickness direction.

The thickness of the optical anisotropy layer is preferably 0.1 to 10 µm, more preferably 0.5 to 5 µm and the most preferably 0.7 to 5 µm. However, depending on the mode of the liquid crystal cell, the thickness is sometimes thickened (3 to 10 µm) for obtaining high optical anisotropy. The method for producing the second protection film including the optical anisotropy layer is not particularly limited. For example, the film may be produced by applying the polymer compound and/or liquid crystal compound on a film comprising the thermoplastic resin to form a coated layer, and further subjecting the coated layer to elongation or shrinkage.

As an alternative for imparting the optical compensation function to the polarization plate of the present invention, a film having a birefringent property may be laminated on the protection film on the cell side. In this case, it is preferable that the protection film on the cell side is optically isotropic, and the absolute values of both the retardation Re and Rth are preferably 3 nm or less.

One aspect of the liquid crystal display device of the present invention is a liquid crystal display device having a light source, an incident-side polarization plate, a liquid crystal cell and an emission-side polarization plate in this order, wherein the incident-side polarization plate and/or the emission-side polarization plate is the aforementioned polarization plate. In this device, it is preferable that the aforementioned polarization plate is used as the emission-side polarization plate. With such a constitution, it is possible to provide a liquid crystal display device which is excellent in visual quality.

In the preferable liquid crystal display device of the present invention, the observation side of the liquid crystal panel is provided with the aforementioned polarization plate. The liquid crystal display device is usually provided with two polarization plates sandwiching the liquid crystal panel. The observation side of the liquid crystal panel is a side on which an observer can visually observe a displayed image. The polarization plate of the present invention, particularly the polarization plate in which the aforementioned protection film for the polarization plate has been laminated on the observation side, has the excellent visibility. Thus it is preferable that the plate is disposed on the observation side of the liquid crystal panel.

The liquid crystal display device of the present invention has at least one polarization plate of the present invention and the liquid crystal panel. The liquid crystal panel is not particularly limited as long as it is used for the liquid crystal display device. Example thereof may include TN (Twisted Nematic) type liquid crystal panels, STN (Super Twisted Nematic) type liquid crystal panels, HAN (Hybrid Alignment Nematic) type liquid crystal panels, IPS (In Plane Switching) type liquid crystal panels, VA (Vertical Alignment) type liquid crystal panels, MVA (Multiple Vertical Alignment) type liquid crystal panels, and OCB (Optical Compensated Bend) type liquid crystal panels.

A preferable specific example of the liquid crystal display device of the present invention is shown in FIG. 1. The device shown in FIG. 1 is a liquid crystal display device having a light sources 10, an incident-side polarization plate 11, a liquid crystal cell 12 and an emission-side polarization plate 13 in this order. In this example, each of the incident-side polarization plate 11 and the emission-side polarization plate 13 has a polarization plate (which is also referred to herein as the optical compensation film) composed of a polarizer 2, a first protection film 3 and a second protection film 4. The emission-side polarization plate 13 further has an optical function layer 5 on the emission side of the polarization plate.

Another aspect of the liquid crystal display device of the present invention may be a liquid crystal display device having the reflection plate, the liquid crystal cell and the emission side polarization plate in this order, wherein the emission-side polarization plate is the polarization plate of the present invention. In this case, when the second protection film in the polarization plate of the present invention satisfies the aforementioned requirement (iii) and the optical compensation film is a quarter wavelength plate, the polarization plate functions as a circular polarization plate. It is particularly preferable that the quarter wavelength plate of this circular polarization plate is located closer to the liquid crystal cell than the polarizer of this polarization plate.

Still another aspect of the liquid crystal display device of the present invention may be a transreflective type liquid crystal display device having the incident-side polarization plate, a transreflective liquid crystal cell and the emission-side polarization plate in this order, wherein at least one of the incident-side polarization plate and the emission-side polarization plate is the polarization plate of the present invention. Also in this case, when the second protection film in the polarization plate of the present invention satisfies the aforementioned requirement (iii) and the optical compensation film is the quarter wavelength plate, the polarization plate functions as the circular polarization plate. It is particularly preferable that the quarter wavelength plate of this circular polarization plate is located closer to the liquid crystal cell than the polarizer of this polarization plate.

The touch panel of the present invention is a touch panel provided on the surface of the display device, and comprises a first transparent substrate and a second transparent substrate disposed in a distantly opposed manner to the first transparent substrate. And, on the device surface the first transparent substrate is provided with the polarization plate of the present invention. When the second protection film in the polarization plate satisfies the aforementioned requirement (iii) and the optical compensation film is the quarter wavelength plater the polarization plate functions as the circular polarization plate. It is particularly preferable that the quarter wavelength plate of this circular polarization plate is located closer to the liquid crystal cell than the polarizer of this polarization plate.

Figure 2:
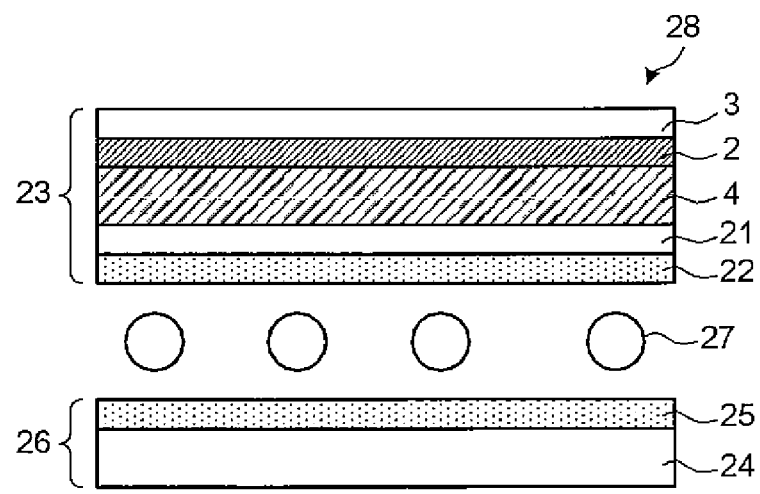
FIG. 2 is a cross-sectional view schematically showing a touch panel having a polarization plate of the present invention.

A preferable specific example of the touch panel of the present invention is shown in FIG. 2. The touch panel 28 shown in FIG. 2 has an upper electrode 23 as the first transparent substrate and a lower electrode 26 as the second transparent substrate. The upper electrode 23 and the lower electrode 26 are disposed in a distantly opposed manner via dot spacers 27. The upper electrode 23 has a polarization plate composed of the polarizer 2, the first protection film 3 and the second protection film 4 (optical compensation film) on its surface side (upper side in FIG. 2), the hard coat layer 21 and a transparent conductive film 22. Meanwhile, the lower electrode 26 has a glass plate 24 and a transparent conductive film 25. When a user touches the touch panel 28 from the surface side, the upper electrode warps, and the transparent conductive films 22 and 25 are contacted, whereby user's touching action on the touch panel can be detected.

The touch panel shown in FIG. 2 may be obtained as follows. The hard coat layer 21 is formed on a surface of the optical compensation film (optical isomer) 4 of the present polarization plate, and then the transparent conductive film 22 is formed to obtain the upper electrode 23. Subsequently the transparent conductive film 25 is formed on one surface of the glass plate 24 to obtain the lower electrode 26. The dot spacers 27 are formed on the surface of the transparent conductive film 25 of the glass plate 24, and the upper electrode 23 and the lower electrode 26 are adhered so that the transparent conductive films 22 and 25 are opposed each other, to obtain the touch panel 28.

The protection film of the present invention is a protection film which may be preferably used as the first protection film in the polarization plate of the present invention.

The protection film of the present invention has an intermediate layer containing the thermoplastic resin it a surface layer 2 containing the thermoplastic resin 2 and laminated on one surface of the intermediate layer and a surface layer 3 containing the thermoplastic resin 3 and laminated on the other surface of the intermediate layer. Either one or both of the surface layer 2 and surface layer 3 are composed of the acrylic resin having the glass transition temperature (Tg) of 100° C. or higher.

Preferably, among the surface layers 2 and 3, at least one surface layer located on the side opposite to the side faced to the subject to be protected (polarizer in the polarization plate of the present invention) is composed of the acrylic resin having the glass transition temperature (Tg) at 100° C. or higher.

In the protection film of the present invention, the intermediate layer contains the ultraviolet light absorber, and any one or more of the intermediate layer, the surface layer 2 and the surface layer 3 contain the elastic particles. Preferably either one or both of the surface layer 2 and the surface layer 3 contain the elastic fine particles.

As the thermoplastic resins 1 to 3 which compose the protection film of the present invention, it is specifically possible to use those enumerated as the materials for the intermediate layer and the surface layers which compose the first protection film.

Examples and Comparative Examples of the polarization plate and the liquid crystal display device according to the present invention will be described hereinbelow. The following Examples are merely exemplifications for suitably describing the present invention, and do not limit the present invention.

EXAMPLES

In the following exemplifications, a polarization plate was composed of a polarizer (P), an emission side protection film (first protection film (A)) attached to the emission side of the polarizer (P), an incident side protection film (second protection film (B)) attached to the incident side of the polarizer (P), a hard coat layer (H) laminated on the visible side surface of the emission side protection film (first protection film (A)), and a low refractive index layer (anti-reflection) layer laminated on an outer surface of the hard coat layer (H). As the polarizer (P), the hard coat layer (H) and the low refractive index layer (L), those having the same composition and the same thickness as described later were used in all cases of the Examples and Comparative Examples.

As will be described later in detail, a laminate film (A1) composed of three layers that are (a polymethyl methacrylate (PMMA) resin layer)—(a low hardness polymethyl methacrylate (R-PMMA) resin layer)—(a polymethyl methacrylate (PMMA) resin layer) was used as the first protection film in Example 1-1. As the second protection film, a second protection film (B1) described later was used.

Likewise, in Example 1-2, the laminate film (A1) was used as the first protection film, and a second protection film (B2) described later was used as the second protection film. In Example 1-3, the laminate film (A1) was used as the first protection film, and the laminate film (A1) was also used as the second protection film. In Example 1-4, the laminate film (A1) was used as the first protection film, and a second protection film (B3) described later was used as the second protection film.

In Example 1-5, a laminate film (A3) composed of three layers that are (a polymethyl methacrylate (PMMA) resin layer)—(a cellulose acetate butyrate (CAB) resin layer)—(a polymethyl methacrylate (PMMA) resin layer) was used as the first protection film, and the laminate layer (A1) was used as the second protection layer.

In Example 1-6, a laminate film (A2) composed of three layers that are (a polymethyl methacrylate (PMMA) resin layer)—(an alicyclic olefin polymer (COP) layer)—(a polymethyl methacrylate (PMMA) resin layer) was used as the first protection film, and the laminate layer (A1) was used as the second protection layer.

In Example 1-7, a laminate film (A6) composed of three layers that are (a polymethyl methacrylate (R-PMMA2) resin layer)—(a polymethyl methacrylate (PMMA2) layer)—(a polymethyl methacrylate (R-PMMA2) resin layer) was used as the first protection film, and the laminate film (A1) described later was used as the second protection layer.

In Comparative Example 1-1, the laminate film (A1) was used as the first protection film, and a second protection film (B4) described later was used as the second protection film. In Comparative Example 1-2, a monolayer PMMA resin film (A4) was used as the first protection film, and the second protection film (B1) described later was used as the second protection film. In Comparative Example 1-3, a monolayer TAC resin film (A5) was used as the first protection film, and the second protection film (B1) described later was used as the second protection film.

Subsequently, prior to describing in detail Examples and Comparative Examples of the polarization plate and the liquid crystal display device of the present invention, each Production Example of the polarizer (P), the material for forming the hard coat layer (H), the material for forming the low refractive index layer (L) CAB, the first protection film and the second protection film will be described.

Production Example 1

Production of Polarizer

A polyvinyl alcohol film having a refractive index of 1.545 at a wavelength of 380 nm, a refractive index of 1.521 at a wavelength of 780 nm and having a thickness of 75 μm was uniaxially elongated to 2.5 times, and immersed in an aqueous solution containing 0.2 g/L of iodine and 60 g/L of potassium iodine at 30° C. for 240 seconds, then immersed in an aqueous solution containing 70 g/L of boric acid and 30 g/L of potassium iodine and simultaneously uniaxially elongated to 6.0-times and kept for 5 minutes. Finally, the film was dried at room temperature for 24 hours to yield a polarizer (P) having an average thickness of 30 μm and a polarization degree of 99.95%.

Production Example 2

Preparation of Material for Forming Hard Coat Layer (H)

30 Parts of hexafunctional urethane acrylate oligomer, 40 parts of butyl acrylate, 30 parts of isoboronyl methacrylate and 10 parts of 2,2-diphenylethane-1-one were mixed using a homogenizer. A solution of 40% antimony pentaoxide fine particles (average particle diameter: 20 nm; one hydroxyl group is hound to an antimony atom which appears on the surface of a pyrochlore structure) in methyl isobutyl ketone was mixed therewith at a ratio so that the weight of the antimony pentaoxide fine particles occupies 50% by weight of the total solid content of the material for forming the hard coat layer, to prepare the material for forming the hard coat layer (H).

Production Example 3

Preparation of Material Forming Low Refractive Index Layer (L))

70 Parts by weight of vinylidene fluoride which is a fluorine-containing monomer and 30 parts by weight of tetrafluoroethylene were dissolved in methyl isobutyl ketone. Subsequently, a hollow silica isopropanol dispersion sol (solid content: 20% by weight, average primary particle diameter: about 35 nm, outer shell thickness: about 8 nm, supplied from Catalyst & Chemicals Industries Co., Ltd.) at 30% by weight in terms of hollow silica solid content relative to the fluorine-containing monomer solid content, dipentaerythritol hexaacrylate (supplied from Shin-Etsu Chemical Co., Ltd.) at 3% by weight relative to the aforementioned solid content, and a photo radical generator Irgacure 184 (supplied from Ciba Specialty Chemicals) at 5% by weight relative to the aforementioned solid content were added thereto, to prepare the material for forming the low refractive index layer (L).

Production Example 4

Production of Cellulose Acetate Butyrate (CAB)

91% By weight of cellulose acetate butyrate (substitution degree of acetyl group: 1.0, substitution degree of butyryl group: 1.7, weight average molecular weight: 155,000, CAB-381-20 supplied from Eastman Chemical) which is an acetylacyl cellulose being a high molecular compound having hydrophilic groups, and 9% by weight of diglycerine tetracaprylate which is a plasticizer were kneaded using a biaxial extruder at 190° C. and cut into about 5 mm pieces to yield cellulose acetate butyrate.

Production Example 5

Production of Protection Film (A1))

A polymethyl methacrylate resin without elastic particles (glass transition temperature: 110° C., tensile elastic modulus: 3.3 GPa, abbreviated as PMMA hereinbelow and in tables) was introduced into a double flight type uniaxial extruder equipped with a leaf disc shaped polymer filter having a screen aperture of 10 μm. The melted resin was supplied to a surface of a multimanifold die having a surface roughness Ra of 0.1 μm on a die slip at an extruder exit temperature of 260° C.

Meanwhile, a polymethyl methacrylate resin containing elastic particles having a number average particle diameter of 0.4 μm (glass transition temperature: 100° C., tensile elastic modulus: 2.8 GPa, abbreviated as R-PMMA hereinbelow and in tables) and an ultraviolet light absorber (trade name "LA31" supplied from Asahi Denka Kogyo K.K.) were mixed so that the concentration of the ultraviolet light absorber was 5% by weight, to yield a mixture 1. The mixture 1 was introduced into the double flight type uniaxial extruder equipped with the leaf disc shaped polymer filter having the screen aperture of 10 μm. The melted resin was supplied to the other side of the multimanifold die having a surface roughness Ra of 0.1 μm on the die slip at an extruder exit temperature of 260° C.

The melted polymethyl methacrylate resin without elastic particles and the melted polymethyl methacrylate resin containing the elastic particles were discharged from the multimanifold die at 260° C., cast on a cooling roll whose temperature was adjusted to 130° C., and subsequently passed through another cooling roll whose temperature was adjusted to 50° C., to yield a protection film (A1) having a width of 600 mm and a thickness of 80 μm and composed of three layers that are (PMMA resin layer (20 μm))—(R-PMMA resin layer (40 μm))—(PMMA resin layer (20 μm)) by coextrusion molding method.

As to the PMMA resin layer, the refractive index at the wavelength of 380 nm was 1.512 and the refractive index at the wavelength of 780 nm was 1.488. As to the R-PMMA resin layer, the refractive index at the wavelength of 380 nm was 1.507 and the refractive index at the wavelength of 780 nm was 1.489.

The moisture permeability of the resulting protection film (A1) was 51.0 g/m$^2$·24 h. On the surface of this protection film (A1), the depth of the linear concave portion or the height of the linear convex portion was 20 nm or less, and their width was 800 nm or more. As to the resulting protection film (A1), Re was 0.4 nm and Rth was 2.6 nm.

Production Example 6

Production of First Protection Film (A2)

The cellulose acetate butyrate (CAB) (tensile elastic modulus: 1.5 GPa) and the ultraviolet light absorber (trade name "LA31" supplied from Asahi Denka Kogyo K.K.) were mixed so that the concentration of the ultraviolet light absorber was 5% by weight, to yield a mixture 2.

The aforementioned mixture 2 was introduced into a second double flight type uniaxial extruder equipped with the leaf disc shaped polymer filter having the screen aperture of 10 μm. The melted resin was supplied to a surface of the second multimanifold die having a surface roughness Ra of 0.1 μm on a die slip, which composes the multimanifold die, at an extruder exit temperature of 260° C.

Meanwhile, the polymethyl methacrylate resin without elastic particles (tensile elastic modulus: 3.3 GPa, abbreviated as PMMA hereinbelow and in tables) was introduced into the double flight type uniaxial extruder equipped with the leaf disc shaped polymer filter having the screen aperture of 10 μm. The melted resin was supplied to the other side of the multimanifold die having a surface roughness Ra of 0.1 μm on the die slip, at an extruder exit temperature of 260° C.

The melted polymethyl methacrylate resin without elastic particles, cellulose acetate butyrate and an ethylene-vinyl acetate copolymer as an adhesive were discharged from the multimanifold die at 260° C., cast on a cooling roll whose temperature was adjusted to 130° C., and subsequently passed through another cooling roll whose temperature was adjusted to 50° C., to yield a first protection film (A2) having a width of 600 mm and a thickness of 80 µm and composed of three layers that are (PMMA resin layer (20 µm))—(adhesive (4 µm))—(CAB resin layer (32 µm))—(adhesive (4 µm))—(PMMA resin layer (20 µm)) by the coextrusion molding method.

As to the PMMA resin layer, the refractive index at the wavelength of 380 nm was 1.512 and the refractive index at the wavelength of 780 nm was 1.488. As to the CAB resin layer, the refractive index at the wavelength of 380 nm was and the refractive index at the wavelength of 780 nm was.

The moisture permeability of the resulting first protection film (A2) was 84.0 g/m$^2$·24 h. On the surface of the protection film (A2), the depth of the linear concave portion or the height of the linear convex portion was 20 nm or less, and their width was 800 nm or more.

Production Example 7

Production of First Protection Film (A3)

An alicyclic olefin polymer (COP) (glass transition temperature: 140° C., brand name: ZEONOR1430 supplied from Zeon Corporation) dried at 100° C. for 3 hours and the ultraviolet light absorber (trade name "LA31" supplied from Asahi Denka Kogyo K.K.) were mixed so that the concentration of the ultraviolet light absorber was 5% by weight, to yield a mixture 3.

A first protection film (A3) having a width of 600 mm and a thickness of 80 pun and composed of three layers that are (PMMA resin layer (20 µm))—(adhesive (4 µm))—(COP resin layer (32 µm))—(adhesive (4 µm))—(PMMA resin layer (20 µm)) was yielded by the coextrusion molding method in the same way as in Production Example 6 except that the mixture 3 was used in place of the mixture 2.

As to the PMMA resin layer, the refractive index at the wavelength of 380 nm was 1.512 and the refractive index at the wavelength of 780 nm was 1.488. As to the COP resin layer, the refractive index at the wavelength of 380 nm was 1.555 and the refractive index at the wavelength of 780 nm was 1.529.

The moisture permeability of the resulting first protection film (A3) was 1.0 g/m$^2$·24 h. On the surface of the protection film (A3), the depth of the linear concave portion or the height of the linear convex portion was 20 nm or less, and the width was 800 nm or more.

Production Example 8

Production of Second Protection Film (B1)

Pellets of an alicyclic olefin resin (brand name: ZEONOR1420R supplied from Zeon Corporation) were dried at 70° C. for 2 hours to remove moisture using a hot air dryer circulating an air, and subsequently extruded at an extruder temperature of 260° C. and a die temperature of 260° C. using a T-die (width of T-die: 350 nm, a die slip member was polished with a grind stone of tungsten carbide and #1000 diamond, a chromium plating of an average height Ra=0.05 µm was given to the inside) type resin melting extruder provided with a resin melting kneader equipped with a leaf disc shaped polymer filter (filtration accuracy: 30 µm) and a screw of 65 mmϕ. The extruded sheet-shaped thermoplastic resin was cooled by passing through three cooling drums (diameter: 300 mm, drum temperature: 100° C., feeding speed: 0.35 m/s) to yield a pre-elongation film 1 having a thickness of 200 µm and a width of 300 mm. The depth and the height of the linear concave and convex portions which ran straightly in the longitudinal direction of the film (depth and height of die lines) were 30 nm in maximum, and their width was 1300 nm in minimum.

This pre-elongation film 1 was simultaneously biaxially elongated to yield a second protection film (B1) using a coaxial biaxial elongation machine at the oven temperature (preheating temperature, elongation temperature and heat fixing temperature) of 136° C., the film feeding speed of 1 m/minute, the chuck moving accuracy of within ±1%, the lengthwise elongation ratio of 1.41 times and the crosswise elongation ratio of 1.41 times. Corona discharge treatment using a high-frequency generator (high-frequency power supply: AGI-024, output: 0.8 KW supplied from Kasuga Electric Co., Ltd.) was given to both surfaces of this second protection film (B1) to yield the second protection film (B1) having a surface tension of 0.055 N/m. As to the resulting second protection film (B1), the in-plane retardation Re in a center portion in a film width direction measured at the wavelength of 550 nm was 50 nm, the retardation Rth in the thickness direction was 130 nm, and the unevenness of the in-plane retardations Re was ±5 nm in the width direction and ±2 nm in the longitudinal direction.

Production Example 9

Production of Second Protection Film (B2)

25 mL/m$^2$ Of a solution of 1.5 mol/L potassium hydroxide in isopropyl alcohol was applied onto one surface of a triacetyl cellulose film having a thickness of 80 µm, and dried at 25° C. for 5 seconds. The surface of the film was washed with running water for 10 seconds and dried by blowing air at 25° C. to yield a second protection film (B2) that is a triacetyl cellulose film only one surface of which was subjected to saponification treatment.

Production Example 10

Production of Second Protection Film (B3)

A monolayer of the polymethyl methacrylate resin containing elastic particles having a number average particle diameter of 0.4 pun (tensile elastic modulus: 2.8 GPa) was extruded and molded to yield a second protection film (B3) having a thickness of 80 µm.

Production Example 11

Production of Second Protection Film (B4)

A monolayer of a polycarbonate resin (tensile elastic modulus: 2 GPa) was extruded and molded to yield a second protection film (B4) having the thickness of 80 µm.

Production Example 12

Production of First Protection Film (A6)

<12-1: Preparation of Multilayer Structure Acrylic Rubber Particles>

In a reactor vessel equipped with a stirrer and a condenser, 6860 mL of distilled water and 20 g of sodium dioctylsulfosuccinate as an emulsifier were placed, and the temperature was raised up to 75° C. with stirring under a nitrogen atmosphere to yield a distilled water with the emulsifier under the condition of no oxygen influence.

A mixture composed of 220 g of methyl methacrylate, 33 g of n-butyl acrylate, 0.8 g of allyl methacrylate (abbreviated as ALMA hereinbelow) and 0.2 g of diisopropylbenzene hydroperoxide (abbreviated as PBP hereinbelow) was added to the distilled water with the emulsifier, and they were kept at 80° C. for 15 minutes to polymerize a first layer.

Subsequently, to the reaction solution after completing the polymerization of the first layer, a mixture composed of 1270 g of n-butyl acrylate, 320 g of styrene, 20 g of diethylene glycol acrylate, 13.0 q of ALMA and 1.6 g of PBP was continuously added dropwise over one hour. After the addition, the reaction was further effected over 40 minutes to polymerize a second layer.

Then, as a third polymerization, a mixture composed of 340 g of methyl methacrylate, 2.0 g of n butyl acrylate, 0.3 g of PBP and 0.1 g of octylmercaptan was added to the reaction solution after completing the reaction of the second layer. Further, a mixed solution composed of 340 g of methyl methacrylate, 2.0 g of n butyl acrylate, 0.3 g of PBP and 1.0 g of n-octylmercaptan was added thereto. Subsequently, the temperature was raised up to 95° C., which was kept for 30 minutes to yield a latex of multilayer structure acrylic rubber particles. The latex in a small amount was collected, and an average particle diameter was obtained by an absorbency method, and it was 200 nm.

The resulting latex was placed in an aqueous solution of 0.5% aluminium chloride, to cause aggregation of the polymer. The aggregate was washed five times with warm water and dried to yield multilayer acrylic particles.

<12-2: Preparation of Polymethyl Methacrylate Resin Containing Elastic Particles>

80 Parts by weight of a polymethyl methacrylate "Derpet 80NH" (brand name supplied from Asahi Kasei Chemicals Corporation, methyl methacrylate/methyl acrylate copolymer) and 20 parts by weight of the aforementioned multilayer acrylic rubber particles obtained in the aforementioned <12-1> were mixed, and then melted and kneaded using the biaxial extruder at 260° C. to yield a methacrylic resin containing the elastic particles (referred to as R-PMMA2 hereinbelow).

The glass transition temperature and the tensile elastic modulus of the resulting R-PMMA2 were 102° C. and 2.5 GPa, respectively.

A polymethyl methacrylate resin "Derpet 980N" (brand name supplied from Asahi Kasei Chemicals Corporation, methyl methacrylate/styrene/maleic acid anhydride copolymer, glass transition temperature: 120° C., tensile elastic modulus: 3.5 GPa) and the ultraviolet light absorber (trade name "LA31" supplied from Asahi Denka Kogyo K.K.) were mixed so that the concentration of the ultraviolet light absorber was 3% by weight, to yield a mixture (referred to as PMMA2 hereinbelow)). The resulting PMMA2 was introduced into the double flight type uniaxial extruder equipped with the leaf disc shaped polymer filter having the screen aperture of 10 μm. The melted resin was supplied to a surface of the multimanifold die having a surface roughness Ra of 0.1 μm in the die slip, and at an extruder exit temperature of 260° C.

Meanwhile the R-PMMA2 obtained in the aforementioned procedure was introduced into the double flight type uniaxial extruder equipped with the leaf disc shaped polymer filter having the screen aperture of 10 μm. The melted resin was supplied to the other side of the multimanifold die having a surface roughness Ra of 0.1 μm in the die slip, and at an extruder exit temperature of 260° C.

The melted R-PMMA 2 and PMMA 2 were discharged from the multimanifold die at 260° C., respectively, cast on a cooling roll whose temperature was adjusted to 130° C., and subsequently passed through another cooling roll whose temperature was adjusted to 50° C. to yield a first protection film (A6) having a width of 600 mm and a thickness of 80 μm and composed of three layers that are (R-PMMA2 resin layer (10 μm))—(PMMA2 resin layer (60 μm))—(R-PMMA2 resin layer (10 μm)) by the coextrusion molding method.

As to the PMMA2 resin layer, the refractive index at the wavelength of 380 nm was 1.540 and the refractive index at the wavelength of 780 nm was 1.510. As to the R-PMMA2 resin layer, the refractive index at the wavelength of 380 nm was 1.516 and the refractive index at the wavelength of 780 nm was 1.488.

The moisture permeability of the resulting first protection film (A6) was 51 g/m$^2$·24 h. On the surface of this first protection film (A6), the depth of the linear concave portion or the height of the linear convex portion was 20 nm or less, and the width was 800 nm or more. As to the first protection film (A6), Re was 3 nm, Rth was −6 nm, and the photoelastic coefficient was −3.5×10$^{-13}$ cm$^2$/dyn.

Production Example 13

Preparation of Biaxial Optical Compensation Film (B5))

<Preparation of Dope>

The following materials in predetermined amounts were mixed. The resulting mixture was placed in a sealed vessel and dissolved by gradually raising the temperature up to 45° C. over 60 minutes while the mixture was stirred slowly. The pressure inside the vessel was adjusted to 1.2 atm. This solution was filtrated using Azumi filter paper No. 244 supplied from Azumi Filter Paper Co., Ltd., and then left stand overnight to yield a dope.

Cellulose ester (acetyl group substitution degree: 2.88): 30 parts by weight

Cellulose ester (acetyl group substitution degree: 2.52): 70 parts by weight

Triphenyl phosphate: 3 parts by weight

Methyl phthalyl ethyl glycolate: 4 parts by weight

Tinubin 109 (supplied from Ciba Specialty Chemicals): 3 parts by weight

Methylene chloride: 455 parts by weight

Ethanol: 36 parts by weight

Retardation elevating agent represented by the following chemical structural formula: 5 parts by weight Retardation Elevating Agent

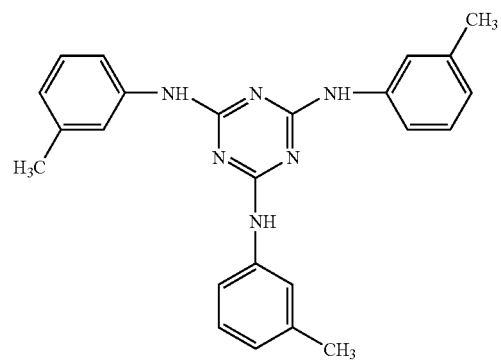

<Preparation of Film>

The dope prepared in the aforementioned procedure was flow-cast at a dope temperature of 30° C. from a die onto a stainless belt (also referred to as a support for flow casting) to form a web. The web was dried for one minute on the stainless belt whose temperature was controlled by contacting warm water at 25° C. from a backside of the stainless belt. Then the stainless belt was made into contact with cold water at 15° C. and kept for 15 seconds. Then the web was peeled off the stainless belt. The residual ratio of the solvent in the web when the web was peeled was 100% by weight. Then, the film was elongated with a tenter at an elongation ratio of 1.15 by gripping the both ends of the peeled web with clips, and changing the interval of the clips along the width direction. At that time, the film temperature was adjusted to be 140° C. Thus a biaxial optical compensation film (B5) having a width of 60 Ham was obtained. As to this biaxial optical compensation film (B5), the in-plane retardation Re was 50 nm and the retardation Rth in the thickness direction was 145 mm when measured at the wavelength of 550 μm.

Production Example 14

Preparation of Biaxial Optical Compensation Film (B6)

An coating solution for orientation film, having the following composition, was applied at 20 mL/m² using a wire bar coater onto a surface of a triacetyl cellulose (TAC) film (Re=3 nm, Rth=45 nm) to which the saponification treatment had been given. Subsequently, the coating solution was dried by a hot air at 60° C. for 60 seconds and the hot air at 100° C. for 120 seconds to form a film. Then, a rubbing treatment was given to the resulting film in the direction parallel with the slow axis direction of the film, to yield an orientation film.

<Composition of Coating Solution for Orientation Film>

Modified polyvinyl alcohol represented by the following chemical structural formula: 10 parts by weight Water: 371 parts by weight Methanol: 119 parts by weight Glutaraldehyde: 0.5 parts by weight

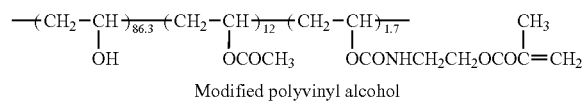

Modified polyvinyl alcohol

Subsequently, 1.8 g of the following discotic liquid crystal compound, 0.2 g of ethylene oxide modified trimethylolpropane triacrylate (trade name "V#360" supplied from Osaka Organic Chemical industry Ltd.), 0.06 g of a photopolymerization initiator (Irgacure 907 supplied from Ciba Specialty Chemicals), 0.02 g of a sensitizer (Kayacure DETX supplied from Nippon Kayaku Co., Ltd.), 0.0036 g of a vertical orientation agent which works on the air interface surface (fluorine containing compound, I-48) and 0.009 q of a vertical orientation agent which work is on the orientation film interface surface (onium salt, II-23) were dissolved in 3.9 g of methyl ethyl ketone, and the resulting solution was applied onto the orientation film using #3 wire bar. This was attached to a metal frame and heated in an incubator at 125° C. for 3 minutes to give orientation to the disco-tic liquid crystal compound represented by the following chemical formula.

Discotic Liquid Crystal Compound

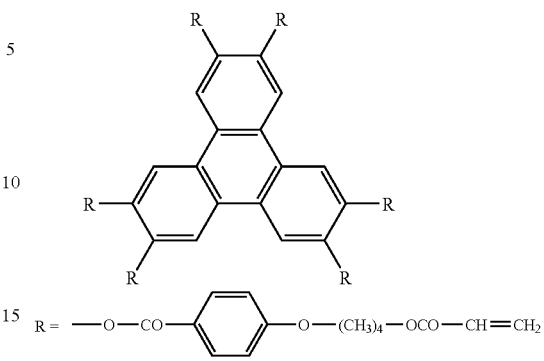

Then, the discotic liquid crystal compound was crosslinked to form an optical anisotropy layer by irradiating UV for 30 seconds using a high pressure mercury lamp at 120 W/cm at 100° C. Subsequently, the temperature was lowered to the room temperature. A biaxial optical compensation film (B6) was thus prepared. The optical property of the discotic optical anisotropy layer alone was calculated by measuring the light incident angle dependency of Re in this biaxial optical compensation film (B6), and subtracting the contribution of the cellulose acetate film that had been previously measured. As a result, Re was 130 nm, Rth was −65 nm and an average oblique angle of the liquid crystal was 89.9°, confirming that the discotic liquid crystal compound was given orientation which is perpendicular to the film plane.

Production Example 15

Preparation of Biaxial Optical Compensation Film (B7)

A solution of 3% polyvinyl alcohol was applied using #16 wire bar coater onto α-triacetyl cellulose film having a thickness of 100 μm on which a gelatin thin film having a thickness of 0.1 μm had been applied (in-plane retardation: 5 nm, retardation in thickness direction: 40 nm, supplied from Fuji Photo Film Co., Ltd.). The solution was dried by the hot air at 80° C., and the rubbing treatment was given thereto, to yield an orientation film.

Subsequently, 1.8 parts by weight of the liquid crystal discotic compound, 0.2 parts by weight of ethylene oxide-modified trimethylolpropane acrylate, 0.04 parts by weight of cellulose acetate butyrate, 0.06 parts by weight of the photopolymerization initiator (Irgacure 907 supplied from Ciba Specialty Chemicals) and 0.02 parts by weight of the sensitizer (Kayacure DETX supplied from Nippon Kayaku Co., Ltd.) were dissolved in 3.43 parts by weight of methyl ethyl ketone to yield a coating solution. This coating solution was applied onto the orientation film using #3 wire bar, and the coated layer was immersed in the incubator at 120° C. for 3 minutes to give orientation to the discotic compound. The coating film was irradiated with ultraviolet light for one minute using a high pressure mercury lamp (120 W/cm) at 120° C., and cooled to the room temperature, to yield a biaxial optical compensation film (B7) having a layer containing the discotic compound having a thickness of 1 μm. In this biaxial optical compensation film (B7), the average oblique angle of an optic angle was 21°, and the retardation in the thickness direction of the liquid crystal layer was 117 nm.

Production Example 16

Preparation of Pre-Elongation Film 2

Pellets of a norbornene polymer (brand name: ZEONOR 1420R supplied from Zeon Corporation, glass transition temperature: 136° C., saturated water absorption: less than 0.01% by weight) were dried at 110° C. for 4 hours using the hot air dryer circulating the air. Using a minor axis extruder having a coat hanger type T die provided with a leaf disc shaped polymer filter (filtration accuracy: 30 μm) and having a chromium plated tip portion on a die lip with the average surface roughness Ra=0.04 μm and a lip width of 650 nm, the aforementioned pellets were melted and extruded at 260° C. to yield a pre-elongation film 2 having a thickness of 100 μm and a width of 600 mm. The retardation value Re(550) at the wavelength of 550 nm of the pre-elongation film 2 was 3 nm.

Production Example 17

Preparation of Pre-Elongation Film 3

Coextrusion molding was performed to obtain a pre-elongation film 3 which has layers composed of the norbornene polymer used in Production Example 17 (Layer II), a layer composed of a styrene maleic acid copolymer (brand name: Daylark D332 supplied from Nova Chemical, glass transition temperature: 130° C., oligomer component content: 3% by weight) (Layer I), and adhesive layers composed of a modified ethylene-vinyl acetate copolymer (brand name; Modic AP A543 supplied from Mitsubishi Chemical Corporation, Vicat softening point: 80° C.) (Layer III) in the order of (Layer II (30 μm))—(Layer III (6 μm))—(Layer I (150 μm))—(Layer III (6 μm))—(Layer II (30 μm)).

Production Example 18

Preparation of Optical Compensation Film (B8)

The pre-elongation film 2 obtained in Production Example 16 was elongated using the elongation machine at the oven temperature (preheating temperature, elongation temperature and heat fixing temperature) of 136° C., the elongation speed of 6 m/minute, and the lengthwise elongation ratio of 1.5 times and 1.3 times to yield optical compensation films C1 and C2, respectively. The retardation values Re (550) at the wavelength of 550 nm of the resulting optical compensation films C1 and C2 were 265 nm and 132.5 nm, respectively.

The optical compensation film C2 was attached to a surface of the optical compensation film C1 via an acrylic adhesive (DP-8005 Clear supplied from Sumitomo 3M Ltd.) so that the cross angle of the slow axes of these films became 59°, to obtain an optical compensation film (B8). As to this optical compensation film (B8), the ratio Re(450)/Rth(550) which is the ratio of the retardation value at the wavelength of 450 nm Re(450) relative to Re(550) was 1.005.

Production Example 19

Preparation of Optical Compensation Film (B9)

Another optical compensation film (brand name: NH film supplied from Nippon Oil Co., Ltd.) was attached to a surface of the optical compensation film C1 via the acrylic adhesive (DP-8005 Clear supplied from Sumitomo 3M Ltd.) so that the cross angle of the slow axes of these films became 59°, to obtain an optical compensation film (B9). As to this optical compensation film (B9), the ratio Re(450)/Rth(550) which is the ration of the retardation value at the wavelength of 450 nm Re(450) relative to Re(550) was 0.86.

Production Example 20

Preparation of Optical Compensation Film (B11)

The pre-elongation film 3 was obliquely elongated using a tenter elongation machine at the elongation temperature of 138° C., the elongation ratio of 1.5 times and the elongation speed of 115%/minute, along the direction inclining at the angle of −13° against the width direction. The elongated film was rolled up over 3000 m to yield an optical compensation film C5. The retardation Re(550) at the wavelength of 550 nm of the resulting optical compensation film C5 was measured, and it was 137.2 nm. The optical compensation film C1 obtained in Production Example 18 was attached to a surface of the aforementioned optical compensation film C5 via the acrylic adhesive (DP-8005 Clear supplied from Sumitomo 3M Ltd.) so that the cross angle of the slow axes of the films became 590, to obtain an optical compensation film (B11). The Re(450)/Re(550) of this optical compensation film (B11) was 0.81.

Production Example 21

Preparation of Optical Compensation Film (B12)

The pre-elongation film 2 was elongated using the elongation machine at the oven temperature (preheating temperature, elongation temperature and heat fixing temperature) of 170° C., the film feeding speed of 6 m/minute, and the lengthwise elongation ratio of 1.75 times and 1.45 times to yield optical compensation films C7 and C5, respectively. The retardation values Re (550) at the wavelength of 550 nm of the resulting optical compensation films C7 and C8 were 265 nm and 132.5 nm, respectively. The optical compensation film C8 was attached to a surface of the optical compensation film C7 via an acrylic adhesive (DP-8005 Clear supplied from Sumitomo SM Ltd.) so that the cross angle of the slow axes of the films became 59', to obtain an optical compensation film (B12). The Re(450)/Re(550) of this optical compensation film (B12) was 1.010.

Example 1-1

Formation of Hard Coat Layer and Anti-Reflection Layer

Corona discharge treatment using the high-frequency generator (output: 0.8 KW) was given to the both surfaces of the aforementioned first protection film (A1) to adjust its surface tension to 0.055 N/m. Then, the material for the hard coat layer (H) was coated on a surface of this first protection film (A1) using a die coater under the environment at the temperature of 25° C. and humidity of 60% RH, and dried in a drying furnace at 80° C. for 5 minutes to yield a coated layer. This layer was irradiated with the ultraviolet light (integrated irradiation quantity: 300 mJ/cm$^2$) to form a hard coat layer having a thickness of 6 μm, to yield a first protection film (A1-H) with the hard coat layer. The refractive index of the hard coat layer (H) was 1.62, and the pencil hardness of the hard coat layer (H) surface was more than 4H.

Subsequently, the material for the low refractive index layer (L) was coated on the hard coat layer (H) of the aforementioned film (A1-H) using the wire bar coater under the environment at the temperature of 25° C. and humidity of 60% RH, and dried by leaving stand for one hour to form a layer. The resulting layer was treated with heat at 120° C. for 10 minutes, and then irradiated with the ultraviolet light with the output of 160 W/cm and an irradiation distance of 60 nm to form a low refractive index (anti-reflection) layer (L) having the thickness of 100 nm (refractive index: 1.37), to thereby obtain a first protection film with the hard coat layer and the low refractive index layer (A1-H-L).

<Preparation of Observer-Side Polarization Plate>

The polyvinyl alcohol adhesive was applied onto the both sides of the aforementioned polarizer (P). The second protection film (B1) was attached to a surface of the polarizer (P) so that the slow axis of the second protection film (B1) and an absorption axis of the polarizer were orthogonal. And, facing the surface on which the anti-reflection (L) layer had not been formed, the aforementioned film (A1-H-L) was stacked on the other surface of this polarizer (P) and they were attached by a roll-to-roll method to yield an observer-side polarization plate FP1.

<Preparation of Backlight-Side Polarization Plate>

The polyvinyl alcohol adhesive was applied onto the both sides of another polarizer (P), and the second protection film (B1) was attached to a surface of the polarizer (P) so that the slow axis of the second protection film (B1) and the absorption axis of the polarizer were orthogonal. The first protection film (A1) was stacked on another surface of the polarizer (P) and attached by the roll-to-roll method to yield a backlight-side polarization plate BP1.

(Production of Liquid Crystal Display Device 1)

On a surface of a vertical alignment mode (VA) liquid crystal cell having a thickness of 2.74 μm, a positive dielectric anisotropy, a birefringent index Δn at the wavelength of 550 nm of 0.09884 and a pretilt angle of 90°, the observer-side polarization plate FP1 was attached so that the first protection film (A1) was on the emission side. The backlight-side polarization plate BP1 was attached on the other side of the liquid crystal cell so that the first protection film (A1) was on the incident side, to thereby produce a liquid crystal display device 1.

Example 1-2

An observer-side polarization plate FP2 and a backlight-side polarization plate BP2 were obtained in the same way as in Example 1-1 except that the second protection film (B2) was used in place of the second protection film (B1). And in the liquid crystal display device 1 of Example 1-1, the observer-side polarization plate FP2 was used in place of the observer-side polarization plate FP1 and the backlight-side polarization plate BP2 was used in place of the backlight-side polarization plate BP1 to obtain a liquid crystal display device 2.

Example 1-3

An observer-side polarization plate FP3 and a backlight-side polarization plate BP3 were obtained in the same way as in Example 11 except that the first protection film (A1) was used in place of the second protection film (B1). And in the liquid crystal display device 1 of Example 1-1, the observer-side polarization plate FP3 was used in place of the observer-side polarization plate FP1 and the backlight-side polarization plate BP3 was used in place of the backlight-side polarization plate BP1 to obtain a liquid crystal display device 3.

Example 1-4

An observer-side polarization plate FP4 and a backlight-side polarization plate BP4 were obtained in the same way as in Example 1-1 except that the second protection film (B3) was used in place of the second protection film (B1), And in the liquid crystal display device 1 of Example 1-1, the observer-side polarization plate BP4 was used in place of the observer-side polarization plate FP1 and the backlight-side polarization plate BP4 was used in place of the backlight-side polarization plate BP1 to obtain a liquid crystal display device 4.

Example 1-5

An observer-side polarization plate FP5 and a backlight side polarization plate BP5 were obtained in the same way as in Example 1-1 except that the first protection film (A2) was used in place of the first protection film (A1) and further the protection film (A1) which had been used as the first protection film in Example 1-1 was used in place of the second protection film (B1). And in the liquid crystal display device 1 of Example 1-1, the observer-side polarization plate FP5 was used in place of the observer-side polarization plate FP1 and the backlight-side polarization plate BP5 was used in place of the backlight-side polarization plate BP1 to obtain a liquid crystal display device 5.

Example 1-6

An observer-side polarization plate FP6 and a backlight side polarization plate BP6 were obtained in the same way as in Example 1-1 except that the first protection film (A3) was used in place of the first protection film (A1) and further the protection film (A1) which had been used as the first protection film in Example 1-1 was used in place of the second protection film (B1). And in the liquid crystal display device 1 of Example 1-1, the observer-side polarization plate FP6 was used in place of the observer-side polarization plate FP1 and the backlight-side polarization plate BP6 was used in place of the backlight-side polarization plate BP1 to obtain a liquid crystal display device 6.

Example 1-7

An observer-side polarization plate FP10 and a backlight-side polarization plate BP10 were obtained in the same way as in Example 1-1 except that the first protection film (A6) was used in place of the first protection film (A1). And in the liquid crystal display device 1 of Example 1-1, the observer-side polarization plate FP10 was used in place of the observer-side polarization plate FP1 and the backlight-side polarization plate BP10 was used in place of the backlight-side polarization plate BP1 to obtain a liquid crystal display device 10.

Comparative Example 1-1

An observer-side polarization plate FP7 and a backlight-side polarization plate BP7 were obtained in the same way as in Example 1-1 except that the second protection film (B4) was used in place of the second protection film (B1). And in the liquid crystal display device 1 of Example 1-1, the observer-side polarization plate FP7 was used in place of the observer-side polarization plate FP1 and the backlight-side polarization plate BP7 was used in place of the backlight-side polarization plate BP1 to obtain a liquid crystal display device 7.

Comparative Example 1-2

Monolayer (PMMA))

An observer-side polarization plate FP8 and a backlight-side polarization plate BP8 were obtained in the same way as in Example 1-1 except that a monolayer extrusion molded film composed of the polymethyl methacrylate resin and having the thickness of 80 μm (A4) was used as the first protection film in place of the first protection film (A1). And in the liquid crystal display device 1 of Example 1-1, the observer-side polarization plate BP8 was used in place of the observer-side polarization plate FP1 and the backlight-side polarization plate BP8 was used in place of the backlight-side polarization plate BP1 to obtain a liquid crystal display device 8. The moisture permeability of the first protection film (A4) was 41 g/m$^2$·24 h.

Comparative Example 1-3

Monolayer (TAC)

An observer-side polarization plate FP9 and a backlight-side polarization plate BP9 were obtained in the same way as in Example 1-1 except that a monolayer cast film composed of triacetyl cellulose (TAC) having a thickness of 80 μm was used as the first protection film (A5) in place of the first protection film (A1). And in the liquid crystal display device 1 of Example 1-1, the observer-side polarization plate BP9 was used in place of the observer-side polarization plate FP1 and the backlight-side polarization plate BP9 was used in place of the backlight-side polarization plate BP1 to obtain a liquid crystal display device 9.

(Evaluation)

The following evaluations were performed for the polarization plates and the liquid crystal display devices obtained in Examples 1-1 to 1-7 and Comparative Examples 1-1 to 1-3. Prior to the evaluation, the tensile elastic modulus (GPa), the film thickness (μm) of each laminated layer and the film thickness of the first protection film were measured. These measurement values and the results of the following performance evaluations were shown in Tables 1 to 6.

(Tensile Elastic Modulus of Resin Layer)

The tensile elastic modulus of the film was measured by forming a monolayer of the thermoplastic resins cutting out therefrom a test piece of 1 cm×25 cm, and measurement was performed on the test piece based on ASTM 882 using a tensile tester (Tensilon UTM-10T-PL supplied from Toyo Baldwin) at a tensile speed of 25 mm/minute. The same measurement was repeated five times, and their arithmetic mean value is taken as a representative value of the tensile elastic modulus.

(Film Thickness of Each Resin Layer)

The film thickness is measured by embedding the film into an epoxy resin, making a slice thereof using a microtome (RYB-2100 supplied from Yamato Kogyo Co., Ltd.) and observing the cross-section thereof using a scanning electron microscope.

(Unevenness of Substrate Film Surface)

The depth of the linear concave portion, the height of the linear convex portion and their width were measured by the method previously described. The maximum values of the depth and the height, and the width of the concave and convex portions exhibiting the maximum values were taken as the depth of the linear concave portion, the height of the linear convex portion and their width of the film, and evaluation was made based on the following criteria.

VG (very good): the depth of the linear concave portion or the height of the linear convex portion was less than 20 nm and its width was 800 nm or more;

G (good): the depth of the linear concave portion or the height of the linear convex portion was 20 nm or more and 50 nm or less and its width was 500 nm or more and less than 800 nm; and B (bad): the depth of the linear concave portion or the height of the linear convex portion was more than 50 nm and its width was less than 500 nm.

(Moisture Permeability of First Protection Film)

The moisture permeability was measured by leaving stand under the environment at 40° C. and 95% RH for 24 hours in accordance with the cup method described in JIS Z 0208. The unit of the moisture permeability is q/m$^2$·24 h.

(Photoelastic Coefficient of Second Protection Film)

The photoelastic coefficient was measured under the condition of the temperature at 20±2° C. and the humidity at 60±5% using a photoelastic coefficient measurement apparatus (PHEL-20A supplied from Uniopt Co., Ltd.). The unit is ×10$^{-13}$ cm$^2$/dyn, (Retardation Re, Rth of Second Protection Film)

The retardation is measured in an arbitrary one point in the center of the film under the condition of the temperature at 20±2° C. and the humidity at 60±5% using an automatic birefringence meter (KOBRA21-ADH supplied from Oji Scientific Instruments Co., Ltd.). The value at the wavelength of 550 nm is taken as the measurement value. The unit is nm.

(Refractive Index of Thermoplastic Resin Layer)

The refractive index was obtained by molding the thermoplastic resin into the monolayer and measuring the sample under the condition of the temperature at 20±2° C. and the humidity at 60±5% using a prism coupler (mode 12010 supplied from Metricon). The refractive index at 380 nm to 780 nm was calculated from the measured refractive indices at the wavelength of 633 nm, 407 nm and 532 nm using Caucy's dispersion formula.

(Film Thickness and Refractive Index of Hard Coat Layer)

The film thickness and the refractive index at the wavelength of 633 nm were measured under the condition of the temperature at 20±2° C. and the humidity at 60±5% using a prism coupler (mode 12010 supplied from Metricon)

(Film Thickness and Refractive Index of Low Refractive Index Layer)

The spectra at incident angles of 55, 60 and 65 degrees and at the wavelengths of 400 nm to 1000 nm were measured under the condition of the temperature at 20±2° C. and the humidity at 60±5% using a high performance spectral ellipsometry (M-2000U supplied from J. A. Woollam), and the film thickness and the refractive index were calculated from these spectra.

(Change of Polarization Plate in Polarization Degree)

A polarization plate for the test was prepared by cutting out the polarization plate into a square of 10 inches, and attaching it on a surface of a glass plate via a pressure-sensitive adhesive so that the side of the second protection film in the polarization plate faces the glass plate. This polarization plate for the test was left stand in the incubator at the temperature of 60° C. and humidity of 90% for 500 hours, and an alteration range of the polarization degrees before and after leaving stand under the high temperature and high humidity was measured at a diagonal intersection point in the polarization plate for the test.

G: the alteration range of polarization degree was 0.5 or less; and

B: the alteration range of polarization degree was larger than 0.5.

(Frame Failure of Liquid Crystal Display Device)

The assembled liquid crystal display device was left stand in the incubator at the temperature of 60° C. and humidity of 90% for 500 hours, and the state of the observer-side polarization plate after leaving stand was visually observed while black image was displayed.

G: no light leakage throughout the surface of the polarization plate; and

B: the light leakage was observed at the periferal of the polarization plate.

(Color Unevenness Evaluation)

The entire display screen was observed directly from the front when the black image was displayed on the assembled liquid crystal display device in a dark room, and evaluated by the following indications.

G: the black color was entirely evenly displayed with no color unevenness; and

B: the color unevenness was observed on the screen.

(Pencil Hardness of Polarization Plate)

The surface of the protection film for the polarization plate (the surface which is opposite to the surface attached to the polarizer) was scratched in length of about 5 mm with a pencil inclined to the angle of 45 degrees and given a downward load of 500 g in accordance with JIS K5600-5-4, and a degree of the scratch was observed. The test was performed using the pencils having the different hardness, and the pencil hardness with which the surface began to be scratched was determined.

(Interference Fringe of Polarization Plate)

The protection film for the polarization plate was placed on a black fabric such as a blackout curtain, and illuminated with a three wavelength fluorescent light (National FL20SS-FNW/18). The surface of the protection film was visually observed, and evaluated in accordance with the following criteria.

G: no interference fringe was observed;

M (moderate): the interference fringes were slightly observed; and

B: the interference fringes were noticeable, (Flexibility of Polarization Plate)

The polarization plate was punched out to yield a test film of 1 cm×5 cm. The resulting film was wound around a steel bar of 3 mmϕ, and it was tested whether the wound film was broken at the bar or not. Total 10 times of the tests were performed, and the flexibility was represented by the following indications, i.e., a frequency of unbroken cases.

G: one or less film piece was broken; and

B: two or more film pieces were broken.

(Evaluation of Curling Property)

The first protection film was cut out into the size of 10 cm×10 cm. This test piece was placed on a horizontal plater and a curling state of the test piece was observed. The curling property was evaluated by the following criteria.

VG: no curling was observed and the state was good;

G: the curling was slightly observed although it was scarcely noticeable; and

B: the curling was clearly observed and practically problematic.

(Punching Property)

The first protection film was punched out using a circular blade having the diameter of 35 mm and using a cutting machine (TCM-500A supplied from Toko Ltd.), and a punching property was evaluated by the following criteria.

G: no crack occurred at the periferal region; and

B: cracks were observed at the periferal region.

(Light Resistance)

The produced polarization plate was exposed to a sunshine carbon arc lamp under the condition of the relative humidity at 60% for 200 hours using a sunshine weather meter (S-80 supplied from Suga Test Instruments Co., Ltd.), and then the samples were taken out. A hue change ($\Delta YI$) of the polarization plate was measured using a calorimeter (supplied from Suga Test Instruments Co., Ltd.), and evaluated by the following criteria.

G: $\Delta YI$ was less than 2; and

B: $\Delta YI$ was 2 or more.

TABLE 1

|  | Examples | | | | | | |
| --- | --- | --- | --- | --- | --- | --- | --- |
|  | 1-1 | 1-2 | 1-3 | 1-4 | 1-5 | 1-6 | 1-7 |
| Polarization plate | 1 | 2 | 3 | 4 | 5 | 6 | 10 |
| Low refractive index layer | L1 | L1 | L1 | L1 | L1 | L1 | L1 |
| Hardcoat layerH | H | H | H | H | H | H |  |
| The first protection film | A1 | A1 | A1 | A1 | A2 | A3 | A6 |
| Resin A | PMMA | PMMA | PMMA | PMMA | PMMA | PMMA | R-PMMA2 |
| Resin B | R-PMMA | R-PMMA | R-PMMA | R-PMMA | CAB | COP | PMMA2 |
| Resin C | PMMA | PMMA | PMMA | PMMA | PMMA | PMMA | R-PMMA2 |
| Polarizer | PVA | PVA | PVA | PVA | PVA | PVA | PVA |
| The second protection film | B1 | B2 | A1 | B3 | A1 | A1 | A1 |
| Light resistance | G | G | G | G | G | G | G |
| Change in polarization degree | G | G | G | G | G | G | G |
| Pencil hardness | >4H | >4H | >4H | >4H | >4H | >4H | 3H |
| Interference fringe | G | G | G | G | G | G | G |

TABLE 1-continued

|  | Examples | | | | | | |
| --- | --- | --- | --- | --- | --- | --- | --- |
|  | 1-1 | 1-2 | 1-3 | 1-4 | 1-5 | 1-6 | 1-7 |
| Punching property | G | G | G | G | G | G | G |
| Curling property | G | G | G | G | G | G | G |
| Flexibility test | G | G | G | G | G | G | G |

TABLE 2

|  | Comparative Examples | | |
| --- | --- | --- | --- |
|  | 1-1 | 1-2 | 1-3 |
| Polarization plate | 7 | 8 | 9 |
| Low refractive index layer | L1 | L1 | L1 |
| Hardcoat layer | H | H | H |
| The first protection film | A1 | A4 | A5 |
| Resin A | PMMA | — | — |
| Resin B | R-PMMA | — | — |
| Resin C | PMMA | PMMA | TAC |
| Polarizer | PVA | PVA | PVA |
| The second protection film | B4 | B1 | B1 |
| Light resistance | G | B | B |
| Change in polarization degree | G | G | M |
| Pencil hardness | >4H | 4H | 4H |
| Interference fringe | G | G | B |
| Punching property | G | B | B |
| Curling property | G | G | B |
| Flexibility test | G | B | B |

TABLE 3

|  | Examples | | | | | | |
| --- | --- | --- | --- | --- | --- | --- | --- |
|  | 1-1 | 1-2 | 1-3 | 1-4 | 1-5 | 1-6 | 1-7 |
| Liquid crystal display | 1 | 2 | 3 | 4 | 5 | 6 | 10 |
| Polarization plate on the observer's side | FP1 | FP2 | FP3 | FP4 | FP5 | FP6 | FP10 |
| Liquid crystal cell | VA | VA | VA | VA | VA | VA | VA |
| Polarization plate on the backlight side | BP1 | BP2 | BP3 | BP4 | BP5 | BP6 | BP10 |
| Frame failure | G | G | G | G | G | G | G |
| Color unevenness evaluation | G | G | G | G | G | G | G |

TABLE 4

|  | Comparative Examples | | |
| --- | --- | --- | --- |
|  | 1-1 | 1-2 | 1-3 |
| Liquid crystal display | 7 | 8 | 9 |
| Polarization plate on the observer's side | FP7 | FP8 | FP9 |
| Liquid crystal cell | VA | VA | VA |
| Polarization plate on the backlight side | BP7 | BP8 | BP9 |
| Frame failure | B | G | B |
| Color unevenness evaluation | G | G | B |

TABLE 5

|  |  | Examples | | | | | | |
| --- | --- | --- | --- | --- | --- | --- | --- | --- |
|  |  | 1-1 | 1-2 | 1-3 | 1-4 | 1-5 | 1-6 | 1-7 |
| Optical function layer |  |  |  |  |  |  |  |  |
| Low refractive index layer | Refractive ratio | 1.37 | 1.37 | 1.37 | 1.37 | 1.37 | 1.37 | 1.37 |
|  | Thickness [nm] | 100 | 100 | 100 | 100 | 100 | 100 | 100 |

TABLE 5-continued

|  |  |  | Examples | | | | | | |
| --- | --- | --- | --- | --- | --- | --- | --- | --- | --- |
|  |  |  | 1-1 | 1-2 | 1-3 | 1-4 | 1-5 | 1-6 | 1-7 |
| Hardcoat layer | Refractive ration |  | 1.62 | 1.62 | 1.62 | 1.62 | 1.62 | 1.62 | 1.62 |
|  | Thickness | [μm] | 6 | 6 | 6 | 6 | 6 | 6 | 6 |
| The first protection film |  |  | A1 | A1 | A1 | A1 | A2 | A3 | A6 |
| Resin A | Tensile elastic modulus | [GPa] | 3.3 | 3.3 | 3.3 | 3.3 | 3.3 | 3.3 | 2.5 |
|  | Film thickness | [μm] | 20 | 20 | 20 | 20 | 20 | 20 | 10 |
| Resin B | Tensile elastic modulus | [GPa] | 2.8 | 2.8 | 2.8 | 2.8 | 1.5 | 2.4 | 3.5 |
|  | Film thickness | [μm] | 40 | 40 | 40 | 40 | 40 | 40 | 60 |
| Resin C | Tensile elastic modulus | [GPa] | 3.3 | 3.3 | 3.3 | 3.3 | 3.3 | 3.3 | 2.5 |
|  | Film thickness | [μm] | 20 | 20 | 20 | 20 | 20 | 20 | 10 |
| Total film thickness | | [μm] | 80 | 80 | 80 | 80 | 80 | 80 | 80 |
| Transmittance (380 nm or less) | | [%] | <20 | <20 | <20 | <20 | <20 | <20 | <20 |
| Haze | | [%] | <1 | <1 | <1 | <1 | <1 | <1 | 4.0 |
| Unevenness | | | VG | VG | VG | VG | VG | VG | VG |
| Moisture permeability | | [g/m2 · day] | 51 | 51 | 51 | 51 | 84 | 5 | 51 |
| The second protection film (on the cell side) | | | B1 | B2 | A1 | B3 | A1 | A1 | A1 |
| Photoelastic coefficient | | | 6 | 12 | −4 | −6 | −4 | −4 | −4 |
| Re/Rth | | | 50/ 130 | 2.7/ 41 | 0.4/ −2.6 | 2.1/ −3.8 | 0.4/ −2.6 | 0.4/ −2.6 | 0.4/ −2.6 |

TABLE 6

|  |  |  | Comparative Examples | | |
| --- | --- | --- | --- | --- | --- |
|  |  |  | 1-1 | 1-2 | 1-3 |
| Optical function layer |  |  |  |  |  |
| Low refractive index layer | Refractive ratio |  | 1.37 | 1.37 | 1.37 |
|  | Thickness | [nm] | 100 | 100 | 100 |
| Hardcoat layer | Refractive ration |  | 1.62 | 1.62 | 1.62 |
|  | Thickness | [μm] | 6 | 6 | 15 |
| The first protection film |  |  | A1 | A4 | A5 |
| Resin A | Tensile elastic modulus | [GPa] | 3.3 | — | — |
|  | Film thickness | [μm] | 20 | — | — |
| Resin B | Tensile elastic modulus | [GPa] | 2.8 | — | — |
|  | Film thickness | [μm] | 40 | — | — |
| Resin C | Tensile elastic modulus | [GPa] | 3.3 | 3.3 | 3.3 |
|  | Film thickness | [μm] | 20 | 80 | 80 |
| Total film thickness | | [μm] | 80 | 80 | 80 |
| Transmittance (380 nm or less) | | [%] | <20 | >60 | >60 |
| Haze | | [%] | <1 | <1 | <1 |
| Unevenness | | | VG | VG | G |
| Moisture permeability | | [g/m2 · day] | 51 | 41 | 250 |
| The second protection film (on the cell side) | | | B4 | B1 | B1 |
| Photoelastic coefficient | | | 70 | 12 | 12 |
| Re/Rth | | | 10/ 50 | 2.7/ 41 | 2.7/ 41 |

As seen in Tables 1 to 6, it was confirmed that the polarization plates of the present invention was harder than the polarization plates of Comparative Examples in terms of the pencil hardness. The polarization plates of the present invention exhibit the performance improvement equivalent to or more than those of Comparative Examples in the change in the polarization degree, the reduction of the interference fringes and the flexibility. The polarization plates of the present invention are remarkably excellent in frame failure.

As described above, the polarization plates according to the present invention have high mechanical strength without impairment of visibility even under the high temperature and high humidity. They are also excellent in flexibility and abrasion resistance, and thus, their appearance never becomes poor. The polarization plate of the present invention is suitable for the display device, particularly the liquid crystal display devices and the touch panels having large areas. The liquid crystal display device of the present invention is provided with the polarization plate of the present invention, thereby having high mechanical strength on its display side, and good appearance. Thus the display device is capable of keeping good visibility even under the high temperature and high humidity.

In the following Examples 2-2 to 2-6 and Comparative Example 2-1 to 2-3, the first protection film in the present invention is referred to as simply the "protection film", and the second protection film is referred to as the "optical compensation film" or the "biaxial optical compensation film".

In Example 2-2, the laminate film (A1) was used as the protection film, and the biaxial optical compensation film (B5) was used as the optical compensation film. In Example 2-3, the laminate film (A1) was used as the protection film, and the biaxial optical compensation film (B6) was used for the biaxial optical compensation film. In Example 2-4, the laminate film (A1) was used as the protection film, and the biaxial optical compensation film (B7) was used as the biaxial optical compensation film.

In Example 2-5, the laminate film (A2) composed of three layers that are (the polymethyl methacrylate (PMMA) resin layer)—(the cellulose acetate butyrate (CAB) resin layer)—(the polymethyl methacrylate (PMMA) resin layer) was used as the protection film, and the biaxial optical compensation film (B1) was used as the biaxial optical compensation film.

In Example 2-6, the laminate film (A3) composed of three layers that are (the polymethyl methacrylate (PMMA) resin layer)—(the alicyclic olefin polymer (COP) layer)—(the polymethyl methacrylate (PMMA) resin layer) was used as the protection film, and the biaxial optical compensation film (B1) was used as the biaxial optical compensation film.

In Comparative Example 2-1, the laminate film (A7) composed of two layers that are (the polycarbonate film (PC))—(the polymethyl methacrylate (PMMA) resin layer) was used as the protection film, and the biaxial optical compensation film (B1) was used as the biaxial optical compensation film. In Comparative Example 2-2, the monolayer PMMA resin film (A4) was used as the protection film, and the biaxial optical compensation film (B1) was used as the biaxial optical compensation film. In Comparative Example 2-3, the monolayer TAC resin film (A5) was used as the protection film, and the biaxial optical compensation film (B1) was used as the biaxial optical compensation film.

Example 2-2

An observer-side polarization plate FP2-2 and a backlight-side polarization plate BP2-2 were obtained in the same way as in Example 1-1 except that the biaxial optical compensation film (B5) was used in place of the biaxial optical compensation film (B1). And in the liquid crystal display device 1 of Example 1-1, the observer-side polarization plate FP2-2 was used in place of the observer-side polarization plate FP1 and the backlight-side polarisation plate BP2-2 was used in place of the backlight-side polarization plate BP1 to obtain a liquid crystal display device 2-2.

Example 2-3

An observer-side polarization plate FP2-3 was obtained in the same way as in Example 1-1 except that the biaxial optical compensation film (B6) was used in place of the biaxial optical compensation film (B1). Specifically, the polyvinyl alcohol adhesive was applied to the both surfaces of the polarizer (P), and a saponified surface of the triacetyl cellulose film was attached to one surface of the polarizer (P) so that the slow axis was perpendicular to the absorption axis of the polarizer (P). The surface of the protection film having the anti-reflection layers on which the anti-reflection layer had not been formed, was stacked on the other side of the polarizer (P), and they were attached by the roll-to-roll method to yield the observer side polarization plate FP2-3. A backlight-side polarization plate BP2-3 was obtained in the same way as in Example 1-1 and the production of observer-side polarization plate FP2-3 except that the biaxial optical compensation film (B6) was used in place of the biaxial optical compensation film (B1).

(Production of Liquid Crystal Display Device)

A liquid crystal cell of an in-plane switching mode (represented as IPS in Tables) having a thickness of 2.74 μm, a positive dielectric anisotropy, a birefringent index Δn at the wavelength of 550 nm of 0.09884 and a pretilt angle of 0° was used. The observer-side polarization plate BP2-3 was attached on a surface of this liquid crystal cell so that the slow axis of the biaxial optical compensation film B6 was parallel with a rubbing direction of the liquid crystal cell and the side on which the discotic liquid crystal had been applied faced the liquid crystal cell. Then, the backlight-side polarization plate BP2-3 was attached to the other side of the liquid crystal cell in a crossed Nicols arrangement to obtain a liquid crystal display device 2-3.

Example 2-4

Production of Polarization Plate

A surface of the polarizer (P) was attached to the surface of the protection film having the anti-reflection layer, on which the anti-reflection layer had not been formed, with the polyvinyl alcohol adhesive. The surface of the triacetyl cellulose film in the biaxial optical compensation film (B7) was attached to the other side of the polarizer (P) with the polyvinyl alcohol adhesive so that the angle made by the absorption axis of the polarizer (P) and the rubbing direction of the biaxial optical compensation film (B7) was 45°. The observer-side polarization plate FP2-4 was thus obtained. A backlight-side polarization plate BP2-4 was obtained in the same way as in the production of the observer-side polarization plate FP2-4 except that the protection film without anti-reflection layer was used in place of the protection film with the anti-reflection layer.

<Production of Liquid Crystal Display Device 2-4>

A polyimide film as the orientation film was provided on a glass substrate with an ITO electrode. The rubbing treatment was given thereto in one direction. Two glass substrates having the orientation film were opposed so that their rubbing directions were parallel. They were joined with a cell gap of 10 μm, and liquid crystal ZLI1132 (Δn=0.1396) supplied from Merck was injected to obtain a bend alignment type liquid crystal cell (represented as OCB in Tables). The observer-side polarization plate FP2-4 was arranged on a surface of the bend alignment type liquid crystal cell so that the liquid crystal layer was faced to the cell, and the backlight-side polarization plate BP2-4 was arranged on the other surface of this liquid crystal cell so that the liquid crystal layer was faced to the cell. The observer-side polarization plate FP2-4 and the backlight-side polarization plate BP2-4 were arranged so that they had the crossed Nicols relationship each other and the rubbing direction of the glass substrate and the rubbing direction of the biaxial optical compensation film B were conversely parallel, to obtain a liquid crystal display device 2-4.

Example 2-5

An observer-side polarization plate FP2-5 and a backlight-side polarization plate BP2-5 were obtained in the same way as in Example 1-1 except that the protection film (A2) was used in place of the protection film (A1). And in the liquid crystal display device 1 of Example 1-1, the observer-side polarization plate FP2-5 was used in place of the observer-side polarization plate FP1 and the backlight-side polarization plate BP2-5 was used in place of the backlight-side polarization plate BP1 to obtain a liquid crystal display device 2-5.

Example 2-6

An observer-side polarization plate FP2-6 and a backlight-side polarization plate BP2-6 were obtained in the same way as in Example 1-1 except that the protection film (A3) was used in place of the protection film (A1). And in the liquid crystal display device 1 of Example 1-1, the observer-side polarization plate FP2-6 was used in place of the observer-side polarization plate FP1 and the backlight-side polarization plate BP2-6 was used in place of the backlight-side polarization plate BP1 to obtain a liquid crystal display device 2-6.

Comparative Example 2-1

The polycarbonate (PC) resin layer of 10 μm and the polymethyl methacrylate (PMMA) resin layer of 60 μm were laminated to yield a protection film (A7) of a bilayer structure. The moisture permeability of the protection film (A7) was 40 g·m$^{-2}$·day$^{-1}$. As to the PMMA resin layer, the refractive index at the wavelength of 380 nm was 1.512 and the refractive index at the wavelength of 780 nm was 1.488. As to the PC resin layer, the refractive index at the wavelength of 380 nm was 1.608 and the refractive index at the wavelength of 780 nm was 1.556. A protection film with the anti-reflection layer was obtained in the same way as in Example 11 except that the protection film (A7) was used in place of the protection film (A1). Upon production, the polymethyl methacrylate resin faced the side of the polarizer. An observer-side polarization plate FP2-7 and a backlight-side polarization plate BP2-7 were obtained using this protection film with the anti-reflection layer in the same way as in Example 1-1. And, the observer-side polarization plate FP2-7 was used in place of the observer-side polarization plate FP1 and the backlight-side polarization plate BP2-7 was used in place of the backlight-side polarization plate BP1 to obtain a liquid crystal display device 2-7.

Comparative Example 2-2

Monolayer (PMMA))

An observer-side polarization plate FP2-8 and a backlight-side polarization plate BP2-8 were obtained in the same way as in Example 1-1 except that the monolayer extrusion molded film composed of the polymethyl methacrylate resin and having a thickness of 80 μm was used as the protection film (A4) in place of the first protection film (A1). And in the liquid crystal display device 1 of Example 11, the observer-side polarization plate FP2-8 was used in place of the observer-side polarization plate FP1 and the backlight-side polarization plate BP2-8 was used in place of the backlight-side polarization plate FP1 to obtain a liquid crystal display device 2-8. The moisture permeability of the protection film (A4) was 41 g/m$^2$·24 h.

Comparative Example 2-3

Monolayer (TAC)

An observer-side polarization plate FP2-9 and a backlight-side polarization plate BP2-9 were obtained in the same way as in Example 1-1 except that a monolayer cast molded film composed of triacetyl cellulose (TAC) and having a thickness of 80 μm was used as the protection film (A5) in place of the first protection film (A1) and the thickness of the hard coat layer was altered to 15 μm. And in the liquid crystal display device 1 of Example 1-1, the observer-side polarization plate FP2-9 was used in place of the observer side polarization plate FP1 and the backlight-side polarization plate BP2-9 was used in place of the backlight-side polarization plate BP1 to obtain a liquid crystal display device 2-9.

The constitutions of Examples 2-2 to 2-6 and Comparative Examples 2-1 to 2-3 described above were shown together with the constitution of Example 1-1 in the following Tables 7 and 8.

TABLE 7

| | Ex. 1-1 | Ex. 2-2 | Ex. 2-3 | Ex. 2-4 | Ex. 2-5 | Ex. 2-6 |
|---|---|---|---|---|---|---|
| Liquid crystal display | 1 | 2-2 | 2-3 | 2-4 | 2-5 | 2-6 |
| Polarization plate on the observer's side | FP1 | FP2-2 | FP2-3 | FP2-4 | FP2-5 | FP2-6 |
| Low refractive index layer | L | L | L | L | L | L |
| HC layer | H | H | H | H | H | H |
| Protection film Resin A | A1 PMMA | A1 PMMA | A1 PMMA | A1 PMMA | A2 PMMA | A3 PMMA |
| Resin B | R-PMMA | R-PMMA | R-PMMA | R-PMMA | CAB | COP |
| Resin C | PMMA | PMMA | PMMA | PMMA | PMMA | PMMA |
| Polarizer | PVA | PVA | PVA | PVA | PVA | PVA |
| Biaxial optical compensation film | B1 | B5 | B6 | B7 | B1 | B1 |
| Liquid crysta cell | VA | VA | IPS | OCB | VA | VA |
| Polarization plate on the backlight side | BP1 | BP2-2 | BP2-3 | BP2-4 | BP2-5 | BP2-6 |
| Biaxial optical compensation film | B1 | B5 | B6 | B7 | B1 | B1 |
| Polarizer | PVA | PVA | PVA | PVA | PVA | PVA |
| Protection film Resin A | A1 PMMA | A1 PMMA | A1 PMMA | A1 PMMA | A2 PMMA | A3 PMMA |
| Resin B | R-PMMA | R-PMMA | R-PMMA | R-PMMA | CAB | COP |
| Resin C | PMMA | PMMA | PMMA | PMMA | PMMA | PMMA |

TABLE 8

| | Comp. Ex. 1 | Comp. Ex. 2 | Comp. Ex. 3 |
|---|---|---|---|
| Liquid crystal display | 2-7 | 2-8 | 2-9 |
| Polarization plate on the observer's side | FP2-7 | FP2-8 | FP2-9 |

TABLE 8-continued

|  |  | Comp. Ex. 1 | Comp. Ex. 2 | Comp. Ex. 3 |
|---|---|---|---|---|
| Low refractive index layer |  | L | L | L |
| HC layer |  | H | H | H |
| Protection film | Resin A | A7<br>PC | A4<br>— | A5<br>— |
|  | Resin B | PMMA | — | — |
|  | Resin C | — | PMMA | TAC |
| Polarizer |  | PVA | PVA | PVA |
| Biaxial optical compensation film |  | B1 | B1 | B1 |
| Liquid crysta cell |  | VA | VA | VA |
| Polarization plate on the backlight side |  | BP2-7 | BP2-8 | BP2-9 |
| Biaxial optical compensation film |  | B1 | B1 | B1 |
| Polarizer |  | PVA | PVA | PVA |
| Protection film | Resin A | A7<br>PC | A4<br>— | A5<br>— |
|  | Resin B | PMMA | — | — |
|  | Resin C | — | PMMA | TAC |

(Evaluations)

The following evaluations were performed for the polarization plates obtained in Examples 1-1, 2-2 to 2-6 and Comparative Examples 2-1 to 2-3. Prior to the evaluation, the tensile elastic modulus (GPa), the film thickness (μm) of each laminated layer, and the film thickness of the protection film were measured. These measurement values and the results of the following performance evaluations are shown in Tables 9 to 12.

(Tensile Elastic Modulus of Resin Layer)

The evaluation was performed in the same way as in Examples 1-1 to 1-7 and Comparative Examples 1-1 to 1-3.

(Film Thickness of Each Resin Layer)

The evaluation was performed in the same way as in Examples 1-1 to 1-7 and Comparative Examples 1-1 to 1-3.

(Refractive Index of Thermoplastic Resin Layer)

The evaluation was performed in the same way as in Examples 1-1 to 1-7 and Comparative Examples 1-1 to 1-3.

(Refractive Index and Film Thickness of Hard Coat Layer)

The evaluation was performed in the same way as in Examples 1-1 to 1-7 and Comparative Examples 1-1 to 1-3.

(Refractive Index and Film Thickness of Low Refractive Index Layer)

The evaluation was performed in the same way as in Examples 1-1 to 1-7 and Comparative Examples 1-1 to 1-3.

(Unevenness of Substrate Film Surface)

The evaluation was performed in the same way as in Examples 1-1 to 1-7 and Comparative Examples 1-1 to 1-3.

(Moisture Permeability of Protection Film)

The evaluation was performed in the same way as in Examples 1-1 to 1-7 and Comparative Examples 1-1 to 1-3.

(Change of Polarization Plate in Polarization Degree)

The evaluation was performed in the same way as in Examples 1-1 to 1-7 and Comparative Examples 1-1 to 1-3.

(Light Leakage Degree)

Two polarization plates for the test used for the aforementioned evaluation for the polarization degree change of the polarization plate were arranged in crossed Nicols so that the optical compensation films were opposed, and the light transmittance was measured in nine sites shown in FIG. 3. Those measurement values were substituted in the following formula to calculate a light leakage degree.

Light leakage degree=$((T2+T4+T6+T8)/4)/((T1+T3+T5+T7+T9)/5)$

Tx represents the light transmittance at a measurement point (x), and (1), (2), (3), (4), (6), (7), 8), and (9) were the measurement points which were at the locations having a distance of 10 mm from the edge. (5) represents the measurement point which was a diagonal intersection point of the polarization plate for the test.

VG: the light leakage degree was less than 1;
G: the light leakage degree was 1 or more and 2 or less; and
B: the light leakage degree was more than 2.

(Pencil Hardness of Polarization Plate)

The evaluation was performed in the same way as in Examples 1-1 to 1-7 and Comparative Examples 1-1 to 1-3.

(Curling Property)

The polarization plate was cut out into the size of 10 cm×10 cm. This test piece was left stand in the incubator at the temperature of 60° C. and the humidity of 90% for 500 hours, and then placed on the horizontal plate, and the curling state of the test piece was observed. The curling property was evaluated by the following criteria.

VG: no curling was observed and the state was good;
G: the curling was slightly observed although it was scarcely noticeable; and
B: the curling was clearly observed and practically problematic.

(Punching Property)

The polarization plate was punched out using the circular blade having the diameter of 35 mm and using the cutting machine (TCM-500A supplied from Toko Ltd.), and the punching property was evaluated by the following criteria.

G: no crack occurred at the periferal region; and
B: cracks were observed at the periferal region.

(Light Resistance)

The evaluation was performed in the same way as in Examples 1-1 to 1-7 and Comparative Examples 1-1 to 1-3.

(Interference Fringes of Polarization Plate)

The evaluation was performed in the same way as in Examples 1-1 to 1-7 and Comparative Examples 1-1 to 1-3.

(Flexibility of Polarization Plate)

The evaluation was performed in the same way as in Examples 1-1 to 1-7 and Comparative Examples 1-1 to 1-3.

(Color Unevenness in Liquid Crystal Display Device)

The entire display screen was observed directly from the front when the brightest image was displayed on the assembled liquid crystal display device in the dark room, and evaluated by the following indications.

G: entirely even white display was observed with no coloration; and
B: iridescent unevenness was observed on the screen (Contrast in Liquid Crystal Display Device)

For the assembled liquid crystal display device, a contrast alteration was examined in an environment test at the temperature of 60° and humidity of 90% for 300 hours. A contrast value was obtained by calculating a ratio of a luminance of the brightest color to that of the darkest color (luminance of the brightest image/luminance of the darkest image) measured using a color luminance meter (color luminance meter BM-7 supplied from Topcon), from the angle inclined by 5 degrees from a central front of the liquid crystal display device. The contrast unevenness was calculated from the contrast before the test CR1 and the contrast after the test CR2 using the following formula.

Contrast unevenness($\Delta CR$)=$(CR1-CR2)/CR1\times100(\%)$

G: less than 10%; and
B: 10% or more

TABLE 9

|  | Ex. 1-1 | Ex. 2-2 | Ex. 2-3 | Ex. 2-4 | Ex. 2-5 | Ex. 2-6 |
|---|---|---|---|---|---|---|
| Polarizing plate evaluations | | | | | | |
| Change in polarization degree | G | G | G | G | G | G |
| Light leakage | VG | G | G | G | G | VG |
| Pencil strength | >4H | >4H | >4H | >4H | >4H | >4H |
| Curling property | G | G | G | G | G | VG |
| Light resistance | G | G | G | G | G | G |
| Punching property | G | G | G | G | G | G |
| Interference fringes | G | G | G | G | G | G |
| Flexibility test | G | G | G | G | G | G |
| Display device for evaluation | 1 | 2 | 3 | 4 | 5 | 6 |
| Color unevenness | G | G | G | G | G | G |
| Contrast | G | G | G | G | G | G |

TABLE 10

|  | Comp. Ex. 2-1 | Comp. Ex. 2-2 | Comp. Ex. 2-3 |
|---|---|---|---|
| Polarizing plate evaluations | | | |
| Change in polarization degree | G | G | B |
| Light leakage | G | G | B |
| Pencil strength | 2H | 4H | 4H |
| Curling property | G | G | B |
| Punching property | G | B | B |
| Light resistance | B | B | B |
| Interference fringes | M | G | B |
| Flexibility test | G | B | B |
| Display device for evaluation | 7 | 8 | 9 |
| Color unevenness | G | G | B |
| Contrast | G | G | B |

TABLE 11

|  |  |  | Ex. 1-1 | Ex. 2-2 | Ex. 2-3 | Ex. 2-4 | Ex. 2-5 | Ex. 2-6 |
|---|---|---|---|---|---|---|---|---|
| Optical function layer | | | | | | | | |
| Low refractive index layer (L) | Refractive ratio | | 1.37 | 1.37 | 1.37 | 1.37 | 1.37 | 1.37 |
| | Thickness | [nm] | 100 | 100 | 100 | 100 | 100 | 100 |
| HC layer (H) | Refractive ratio | | 1.62 | 1.62 | 1.62 | 1.62 | 1.62 | 1.62 |
| | Thickness | [μm] | 6 | 6 | 6 | 6 | 6 | 6 |
| Protection film | | | A1 | A1 | A1 | A1 | A2 | A3 |
| Resin A | Tensile elastic modulus | [GPa] | 3.3 | 3.3 | 3.3 | 3.3 | 3.3 | 3.3 |
| | Thickness | [μm] | 20 | 20 | 20 | 20 | 20 | 20 |
| Resin B | Tensile elastic modulus | [GPa] | 2.8 | 2.8 | 2.8 | 2.8 | 1.5 | 2.4 |
| | Thickness | [μm] | 40 | 40 | 40 | 40 | 40 | 40 |
| Resin C | Tensile elastic modulus | [GPa] | 3.3 | 3.3 | 3.3 | 3.3 | 3.3 | 3.3 |
| | Thickness | [μm] | 20 | 20 | 20 | 20 | 20 | 20 |
| Layer thickness | | [μm] | 80 | 80 | 80 | 80 | 80 | 80 |
| Unevenness | | | VG | VG | VG | VG | VG | VG |
| Moisture permeability | | [g/m2 · 24 h] | 51 | 51 | 51 | 51 | 80 | 5 |

TABLE 12

| | | | Comp. Ex. 2-1 | Comp. Ex. 2-2 | Comp. Ex. 2-3 |
|---|---|---|---|---|---|
| Optical function layer | | | | | |
| Low refractive index layer (L) | Refractive ratio | | 1.37 | 1.37 | 1.37 |
| | Thickness | [nm] | 100 | 100 | 100 |
| HC layer (H) | Refractive ratio | | 1.62 | 1.62 | 1.62 |
| | Thickness | [μm] | 6 | 6 | 15 |
| Protection film | | | A7 | A4 | A5 |
| Resin A | Tensile elastic modulus | [GPa] | 2.3 | — | — |
| | Thickness | [μm] | 10 | — | — |
| Resin B | Tensile elastic modulus | [GPa] | 3.3 | — | — |
| | Thickness | [μm] | 60 | — | — |
| Resin C | Tensile elastic modulus | [GPa] | — | 3.3 | 3.8 |
| | Thickness | [μm] | — | 80 | 80 |
| Layer thickness | | [μm] | 70 | 80 | 80 |
| Unevenness | | | VG | VG | G |
| Moisture permeability | | [g/m2 · 24 h] | 40 | 41 | 250 |

As shown in Tables 7 to 12, the polarization plates of Examples 1-1 and 2-1 to 2-6 were found to have almost no change of the polarization degree, have no interference fringe and have excellent properties in the polarization degree change, light leakage degree, surface hardness (pencil hardness), curling property, punching property and flexibility. It was found that there was no contrast unevenness and no color unevenness with the liquid crystal display devices of Examples 1 to 6, and they were excellent in visibility. Therefore, they were found to have high optical performance and excellent strength.

On the contrary, the polarization plate of Comparative Example 2-1 was inferior in that the interference fringes occurred and the pencil hardness was reduced. The polarization plate of Comparative Example 2-2 was inferior in that the punching property and the flexibility were insufficient. The polarization plate of Comparative Example 2-3 was inferior in that the interference fringes occurred and the light leakage degree, the curling property, the punching property and the flexibility were insufficient. The liquid crystal display device using the polarization plate of Comparative Example 2-3 was insufficient in that the contrast was insufficient and the color unevenness occurred.

As described above, with the polarization plate of the present invention, the mechanical strength is high, and the interference fringes do not occur, the light leakage is reduced and the laminate films are not delaminated compared with the conventional polarization plates even when used under the high temperature and the high humidity. The present pliarization plate further has good properties in the curling property, the punching property and the flexibility, and the good optical compensation function. Such a polarization plate which is excellent in durability under the high temperature and the high humidity can be suitably used for flat panel displays such as touch panels and liquid crystal displays, and particularly the display devices having a big screen of 40 inches or more.

In the following Examples 31 to 3-6 and Comparative Example 3-1 to 3-3, the first protection film in the present invention is referred to as simply the "protection film", and the second protection film is referred to as simply the "optical compensation film".

In Example 3-1, the laminate film (A1) composed of three layers that are (the polymethyl methacrylate (PMMA) resin layer)—(the low hardness polymethyl methacrylate (R-PMMA))—(the polymethyl methacrylate (PMMA) resin layer) was used as the protection film. The optical compensation film (B8) was used as the optical compensation film.

In Example 3-2, the laminate film (A1) was used as the protection film, and the optical compensation film (B9) was used as the optical compensation film. In Example 3-3, the laminate film (A1) was used as the protection film, and the optical compensation film (B10) was used as the optical compensation film. In Example 3-4, the laminate film (A1) was used as the protection film, and the optical compensation film (B21) was used as the optical compensation film.

In Example 3-5, the laminate film (A2) composed of three layers that are (the polymethyl methacrylate (PMMA) resin layer) (the cellulose acetate butyrate (CAB) resin layer)—(the polymethyl methacrylate (PMMA) resin layer) was used as the protection film, and the optical compensation film (B8) was used as the optical compensation film.

In Example 3-6, the laminate film (A3) composed of three layers (the polymethyl methacrylate (PMMA) resin layer)—(the alicyclic olefin polymer (COP) layer)—(the polymethyl methacrylate (PMMA) resin layer) was used as the protection film, and the optical compensation film (B8) was used as the optical compensation film. In Example 7, the laminate film (A1) was used as the protection film, and the optical compensation film (B10) was used as the optical compensation film.

In Comparative Example 3-1, the laminate film (A7) composed of two layers that are (polycarbonate film (PC))—(the polymethyl methacrylate (PMMA) resin layer) was used as the protection film, and the optical compensation film (B12) was used as the optical compensation film. In Comparative Example 3-2, the monolayer PMMA resin film (A4) was used as the protection film, and the optical compensation film (B8) was used as the optical compensation film. In Comparative Example 3-3, the monolayer TAC resin film (A5) was used as the protection film, and the optical compensation film (B8) was used as the optical compensation film.

Example 3-1

Formation of Hard Coat Layer and Anti-Reflection Layer

Corona discharge treatment using the high frequency generator (output: 0.8 KW) was given to both surfaces of the protection film (A1) to adjust its surface tension to 0.055 N/m. Then, the material for the hard coat layer (H) was coated on a surface of this protection film (A1) using the die coater under the environment at the temperature of 25° C. and humidity of 60% RH, and dried in the drying furnace at 80° C. for 5 minutes to yield a coating film. This coating film was further irradiated with the ultraviolet light (integrated irradiation quantity: 300 mJ/cm$^2$) to form a hard coat layer (H) having a thickness of 6 μm. The refractive index of the hard coat layer (H) was 1.62, and the pencil hardness of the hard coat layer (H) surface was more than 4H.

Subsequently, the material for the low refractive index layer (L) was coated on the surface of the hard coat layer (H) of the protection film (A1) having the hard coat layer (H), using the wire bar coater under the environment at the temperature of 25° C. and humidity of 60% RH, and dried by leaving stand for one hour to yield a coating film. The resulting coating film was treated with heat at 120° C. for 10 minutes under an oxygen atmosphere, and then irradiated with the ultraviolet light with the output of 160 W/cm and an irradiation distance of 60 mm to form a low refractive index (anti-reflection) layer (L) having a thickness of 100 nm (refractive index: 1.37).

<Production of Observer-Side Polarization Plate>

The polyvinyl alcohol adhesive was applied onto both surfaces of the polarizer (P). The optical compensation film (B8) was attached to a surface of the polarizer (P) so that the cross angle of the slow axis of the optical compensation film C1 which composed the optical compensation film (B8) and the absorption axis of the polarizer became 15° and the C1 side of the optical compensation film (B8) was contacted with the polarizer P. And, facing the surface on which the anti-reflection layer (L) had not been formed, the protection film (A1) having the anti-reflection layer (L) laminated thereon was stacked on the other surface of this polarizer (P), and both were attached by the roll-to roll method to yield an observer-side polarization plate FP3-1.

<Production of Backlight-Side Polarization Plate>

The polyvinyl alcohol adhesive was applied onto both surfaces of another polarizer (P). The optical compensation film (B8) was attached to a surface of this polarizer (P) so that the cross angle of the slow axis of the optical compensation film C1 which composed the optical compensation film (B8) and the absorption axis of the polarizer (P) became 15° and the C1 side of the optical compensation film (B8) was contacted with the polarizer P. And, a surface of the protection film (A1) was stacked on the other surface of this polarizer (P), and both were attached by the roll-to roll method to yield a backlight-side polarization plate BP3-1.

<Production of Liquid Crystal Display Device 3-1>

A TN mode transreflective type liquid crystal cell having a pretilt angle of both interfaces of the substrate being 2 degrees, a twist angle of 70 degree with left-hand helix, Δnd of 230 nm at a reflection display and about 262 nm at a transmission display was used. A liquid crystal film thickness was 3.5 μm in a reflection electrode region (reflection display) and 4.0 μm in a transmission electrode region (transmission display). The observer-side polarization plate FP3-1, the aforementioned liquid crystal cell and the backlight-side polarization plate BP3-1 were laminated in this order. The surface of the observer-side polarization plate FP3-1 on which the optical compensation film had been laminated, and the surface of the backlight-side polarization plate BP3-1 on which the optical compensation film had been laminated were faced to the liquid crystal cell. Then, a dispersion sheet, an optical waveguide and a backlight were mounted in this order so as to contact with the protection film (A1) of the backlight-side polarization plate BP3-1, to produce a liquid crystal display device 3-1.

Example 3-2

An observer-side polarization plate FP3-2 and a backlight-side polarization plate BP3-2 were obtained in the same way as in Example 3-1 except that the optical compensation film (B9) was used in place of the optical compensation film (B8). And in the liquid crystal display device 3-1 of Example 3-1, the observer-side polarization plate FP3-2 was used in place of the observer-side polarization plate FP3-1 and the backlight side polarization plate BP3-2 was used in place of the backlight-side polarization plate BP3-1 to obtain a liquid crystal display device 3-2.

Example 3-3

An observer-side polarization plate FP3-3 was obtained in the same way as in Example 3-1 except for the following modification-&. A polycarbonate film (brand name: Pureace WR-W supplied from Teijin Limited, represented as PC in Tables) having Re(450)/Re(550) of 0.86 was used as the optical compensation film (B10) in place of the optical compensation film (B8) and attachment was performed so that the cross angle of the absorption axis of the polarizer and the slow axis of the polycarbonate film became 45°. Furthermore, facing the surface on which the anti-reflection layer was not formed, the protection film (A1) having the anti-reflection layer laminated thereon was stacked on the other surface of this polarizer (P), and both were attached by the roll-to roll method to yield an observer-side polarization plate FP3-3. A backlight-side polarization plate BP3-3 was obtained in the same way as in Example 3-1 and the production of the observer-side polarization plate FP3-3 except that the optical compensation film (B10) was used in place of the optical compensation film (B8) and they were attached so that the cross angle of the absorption axis of the polarizer and the slow axis of the polycarbonate film became 45°.

And, in the liquid crystal display device 3-1 of Example 3-1, the observer-side polarization plate FP3-3 was used in place of the observer-side polarization plate FP3-1 and the backlight-side polarization plate BP3-3 was used in place of the backlight-side polarization plate BP3-1 to obtain a liquid crystal display device 3-3.

Example 3-4

An observer-side polarization plate FP3-4 and a backlight-side polarization plate BP3-4 were obtained in the same way as in Example 3-1 except that the optical compensation film (B11) was used in place of the optical compensation film (B8). And in the liquid crystal display device 3-1 of Example 3-1, the observer-side polarization plate FP3-4 was used in place of the observer-side polarization plate FP3-1 and the backlight-side polarization plate BP3-4 was used in place of the backlight-side polarization plate BP3-1 to obtain a liquid crystal display device 3-4.

Example 3-5

An observer-side polarization plate FP3-5 and a backlight side polarization plate BP3-5 were obtained in the same way as in Example 3-1 except that the protection film (A2) was used in place of the protection film (A1). And in the liquid crystal display device 3-1 of Example 3-1, the observer-side polarization plate FP3-5 was used in place of the observer side polarization plate FP3-1 and the backlight-side polarization plate BP3-5 was used in place of the backlight-side polarization plate BP3-1 to obtain a liquid crystal display device 3-5.

Example 3-6

An observer-side polarization plate FP3-6 and a backlight-side polarization plate BP3-6 were obtained in the same way as in Example 3-1 except that the protection film (A3) was used in place of the protection film (A1). And in the liquid crystal display device 3-1 of Example 3-1, the observer-side polarization plate FP3-6 was used in place of the observer-side polarization plate FP3-1 and the backlight-side polarization plate BP3-6 was used in place of the backlight-side polarization plate BP3-1 to obtain a liquid crystal display device 3-6.

Comparative Example 3-1

The polycarbonate (PC) resin layer of 10 μm and the polymethyl methacrylate (PMMA) resin layer of 60 μm were laminated to yield the protection film (A7) of the bilayer structure. The moisture permeability of the protection film (A7) was 40 g·m$^{-2}$·day$^{-1}$. A protection film with the anti-reflection layer was obtained in the same way as in Example 3-1 except that the protection film (A7) was used in place of the protection film (A1) and the optical compensation film (B12) was used as the optical compensation film. At that timer the polymethyl methacrylate resin was located on the side of the polarizer. An observer-side polarization plate FP3-7 and a backlight-side polarization plate BP3-7 were obtained using this protection film with the anti-reflection layer in the same way as in Example 3-1. Andy the observer-side polarization plate FP3-7 was used in place of the observer-side polarization plate FP3-1 and the backlight-side polarization plate BP3-7 was used in place of the backlight-side polarization plate BP3-1 to obtain a liquid crystal display device 3-7.

Comparative Example 3-2

Monolayer (PMMA))

An observer-side polarization plate FP3-8 and a backlight-side polarization plate BP3-8 were obtained in the same way as in Example 3-1 except that the monolayer extrusion molded film composed of the polymethyl methacrylate resin and having the thickness of 80 μm was used as the protection film (A4) in place of the protection film (A1). And in the liquid crystal display device 3-1 of Example 3-1, the observer-side polarization plate FP3-8 was used in place of the observer-side polarization plate FP3-1 and the backlight-side polarization plate BP3-8 was used in place of the backlight-side polarization plate BP3-1 to obtain a liquid crystal display device 3-8. The moisture permeability of the protection film (A4) was 41 g/m$^2$·24 h.

Comparative Example 3-3

Monolayer (TAC)

An observer-side polarization plate FP3-9 and a backlight-side polarization plate BP3-9 were obtained in the same way as in Example 3-1 except that the monolayer cast molded film composed of triacetyl cellulose (TAC) and having the thickness of 80 μm was used as the protection film (A5) in place of the protection film (A1) and the thickness of the hard coat layer was 15 μm. And in the liquid crystal display device 3-1 of Example 3-1, the observer side polarization plate FP3-9 was used in place of the observer-side polarization plate FP3-1 and the backlight-side polarization plate BP3-9 was used in place of the backlight-side polarization plate BP3-1 to obtain a liquid crystal display device 3-9.

The constitutions of Examples 3-1 to 3-6 and Comparative Examples 3-1 to 3-3 described above were shown in the following Tables 13 to 14.

TABLE 13

|  | Ex. 3-1 | Ex. 3-2 | Ex. 3-3 | Ex. 3-4 | Ex. 3-5 | Ex. 3-6 |
|---|---|---|---|---|---|---|
| Liquid crystal display | 3-1 | 3-2 | 3-3 | 3-4 | 3-5 | 3-6 |
| Polarization plate on the observer's side | FP3-1 | FP3-2 | FP3-3 | FP3-4 | FP3-5 | FP3-6 |
| Low refractive index layer | L | L | L | L | L | L |
| HC layer | H | H | H | H | H | H |

TABLE 13-continued

|  |  | Ex. 3-1 | Ex. 3-2 | Ex. 3-3 | Ex. 3-4 | Ex. 3-5 | Ex. 3-6 |
|---|---|---|---|---|---|---|---|
| Protection film | Resin A | A1 PMMA | A1 PMMA | A1 PMMA | A1 PMMA | A2 PMMA | A3 PMMA |
|  | Resin B | R-PMMA | R-PMMA | R-PMMA | R-PMMA | CAB | COP |
|  | Resin C | PMMA | PMMA | PMMA | PMMA | PMMA | PMMA |
| Polarizer |  | PVA | PVA | PVA | PVA | PVA | PVA |
| Optical compensation film |  | B8 | B9 | B10 | B11 | B8 | B8 |
| Liquid crysta cell |  | TN | TN | TN | TN | TN | TN |
| Polarization plate on the backlight side |  | BP3-1 | BP3-2 | BP3-3 | BP3-4 | BP3-5 | BP3-6 |
| Optical compensation film |  | B8 | B9 | B10 | B11 | B8 | B8 |
| Polarizer |  | PVA | PVA | PVA | PVA | PVA | PVA |
| Protection film | Resin A | A1 PMMA | A1 PMMA | A1 PMMA | A1 PMMA | A2 PMMA | A3 PMMA |
|  | Resin B | R-PMMA | R-PMMA | R-PMMA | R-PMMA | CAB | COP |
|  | Resin C | PMMA | PMMA | PMMA | PMMA | PMMA | PMMA |

TABLE 14

|  |  | Comp. Ex. 3-1 | Comp. Ex. 3-2 | Comp. Ex. 3-3 |
|---|---|---|---|---|
| Liquid crystal display |  | 3-7 | 3-8 | 3-9 |
| Polarization plate on the observer's side |  | FP3-7 | FP3-8 | FP3-9 |
| Low refractive index layer |  | L | L | L |
| HC layer |  | H | H | H |
| Protection film |  | A7 | A4 | A5 |
|  | Resin A | PC | — | — |
|  | Resin B | PMMA | — | — |
|  | Resin C | — | PMAA | TAC |
| Polarizer |  | PVA | PVA | PVA |
| Optical compensation film |  | B12 | B8 | B8 |
| Liquid crysta cell |  | TN | TN | TN |
| Polarization plate on the backlight side |  | BP3-7 | BP3-8 | BP3-9 |
| Optical compensation film |  | B12 | B8 | B8 |
| Polarizer |  | PVA | PVA | PVA |
| Protection film |  | A7 | A4 | A5 |
|  | Resin A | PC | — | — |
|  | Resin B | PMMA | — | — |
|  | Resin C | — | PMMA | TAC |

(Evaluations)

The following evaluations were performed for the polarization plates obtained in Examples 3-1 to 3-6 and Comparative Examples 3-1 to 3-3. Prior to the evaluation, the tensile elastic modulus (GPa), the film thickness (μm) of each laminated layer and the film thickness of the protection film were measured. These measurement values and the results of the following performance evaluations were shown in Tables 15 to 18.

(Tensile Elastic Modulus of Resin Layer)

The evaluation was performed in the same way as in Examples 1-1 to 1-7 and Comparative Examples 1-1 to 1-3.

(Film Thickness of Each Resin Layer)

The evaluation was performed in the same way as in Examples 1-1 to 1-7 and Comparative Examples 1-1 to 1-3.

(Refractive Index of Thermoplastic Resin Layer)

The evaluation was performed in the same way as in Examples 2-2 to 2-6 and Comparative Examples 2-1 to 2-3.

(Refractive Index and Film Thickness of Hard Coat Layer)

The evaluation was performed in the same way as in Examples 2-2 to 2-6 and Comparative Examples 2-1 to 2-3.

(Refractive Index and Film Thickness of Low Refractive Index Layer)

The evaluation was performed in the same way as in Examples 2-2 to 2-6 and Comparative Examples 2-1 to 2-3.

(Unevenness of Substrate Film Surface)

The evaluation was performed in the same way as in Examples 1-1 to 1-7 and Comparative Examples 1-1 to 1-3.

(Moisture Permeability of Protection Film)

The evaluation was performed in the same way as in Examples 1-1 to 1-7 and Comparative Examples 1-1 to 1-3.

(Re(450)/Re(550) of Optical Compensation Film)

The ratio of Re(450)/Re(550) was calculated by measuring the in plane retardation Re in the front direction at the wavelengths of 550 nm and 450 nm of the optical compensation film. The in-plane retardation in the front direction was measured using the automatic birefringence meter (KOBRA-21 supplied from Oji Scientific Instruments Co., Ltd.).

(Change of Polarization Plate in Polarization Degree)

The evaluation was performed in the same way as in Examples 1-1 to 1-7 and Comparative Examples 1-1 to 1-3.

(Pencil Hardness of Polarization Plate)

The evaluation was performed in the same way as in Examples 1-1 to 1-7 and Comparative Examples 1-1 to 1-3.

(Curling Property)

The evaluation was performed in the same way as in Examples 2-2 to 2-6 and Comparative Examples 2-1 to 2-3.

(Punching Property)

The evaluation was performed in the same way as in Examples 2-2 to 2-6 and Comparative Examples 2-1 to 2-3.

(Light Resistance)

The evaluation was performed in the same way as in Examples 1-1 to 1-7 and Comparative Examples 1-1 to 1-3.

(Interference Fringes of Polarization Plate)

The evaluation was performed in the same way as in Examples 1-1 to 1-7 and Comparative Examples 1-1 to 1-3.

(Flexibility of Polarization Plate)

The evaluation was performed in the same way as in Examples 1-1 to 1-7 and Comparative Examples 1-1 to 1-3.

(Color Unevenness in Liquid Crystal Display Device)

The evaluation was performed in the same way as in Examples 2-2 to 2-6 and Comparative Examples 2-1 to 2-3.

(Frame Failure)

The evaluation was performed in the same way as in Examples 1-1 to 1-7 and Comparative Examples 1-1 to 1-3.

(Contrast in Liquid Crystal Display Device)

The evaluation was performed in the same way as in Examples 2-2 to 2-6 and Comparative Examples 2-1 to 2-3.

TABLE 15

|  | Ex. 3-1 | Ex. 3-2 | Ex. 3-3 | Ex. 3-4 | Ex. 3-5 | Ex. 3-6 |
|---|---|---|---|---|---|---|
| Change in polarization degree | G | G | G | G | G | G |
| Pencil strength | >4H | >4H | >4H | >4H | >4H | >4H |
| Curling property | G | G | G | G | G | VG |
| Punching property | G | G | G | G | G | G |
| Light resistance | G | G | G | G | G | G |
| Interference fringes | G | G | G | G | G | G |
| Flexibility test | G | G | G | G | G | G |
| Display device evaluation |  |  |  |  |  |  |
| Color unevenness | G | G | G | G | G | G |
| Frame failure |  | G | G | G | G | G |
| Contrast | G | G | G | G | G | G |

TABLE 16

|  | Comp. Ex. 3-1 | Comp. Ex. 3-2 | Comp. Ex. 3-3 |
|---|---|---|---|
| Change in polarization degree | G | G | M |
| Pencil strength | 2H | 4H | 4H |
| Curling property | G | G | B |
| Punching property | G | B | B |
| Light resistance | B | B | B |
| Interference fringes | M | G | B |
| Flexibility test | G | B | B |
| Display device evaluation |  |  |  |
| Color unevenness | B | G | B |
| Frame failure | G | G | B |
| Contrast | B | G | B |

TABLE 17

|  |  | Ex. 3-1 | Ex. 3-2 | Ex. 3-3 | Ex. 3-4 | Ex. 3-5 | Ex. 3-6 |
|---|---|---|---|---|---|---|---|
| Optional function layer | | | | | | | |
| Low refractive index layer (L) | Refractive ratio | 1.37 | 1.37 | 1.37 | 1.37 | 1.37 | 1.37 |
| | Thickness [nm] | 100 | 100 | 100 | 100 | 100 | 100 |

TABLE 17-continued

|  |  |  | Ex. 3-1 | Ex. 3-2 | Ex. 3-3 | Ex. 3-4 | Ex. 3-5 | Ex. 3-6 |
|---|---|---|---|---|---|---|---|---|
| HC layer (H) | Refractive ratio |  | 1.62 | 1.62 | 1.62 | 1.62 | 1.62 | 1.62 |
|  | Thickness | [μm] | 6 | 6 | 6 | 6 | 6 | 6 |
| Protection film |  |  | A1 | A1 | A1 | A1 | A2 | A3 |
| Resin A | Tensile elastic modulus | [GPa] | 3.3 | 3.3 | 3.3 | 3.3 | 3.3 | 3.3 |
|  | Thickness | [μm] | 20 | 20 | 20 | 20 | 20 | 20 |
| Resin B | Tensile elastic modulus | [GPa] | 2.8 | 2.8 | 2.8 | 2.8 | 1.5 | 2.4 |
|  | Thickness | [μm] | 40 | 40 | 40 | 40 | 40 | 40 |
| Resin C | Tensile elastic modulus | [GPa] | 3.3 | 3.3 | 3.3 | 3.3 | 3.3 | 3.3 |
|  | Thickness | [μm] | 20 | 20 | 20 | 20 | 20 | 20 |
| Layer thickness | | [μm] | 80 | 80 | 80 | 80 | 80 | 80 |
| Unevenness |  |  | VG | VG | VG | VG | VG | VG |
| Moisture permeability |  | [g/m² · 24 h] | 51 | 51 | 51 | 51 | 84 | 5 |
| Optical anisotropy layer |  |  | B8 | B9 | B10 | B11 | B8 | B8 |
| Re(450)/Re(550) |  |  | 1.005 | 0.86 | 0.86 | 0.81 | 1.005 | 1.005 |

TABLE 18

|  |  |  | Comp. Ex. 3-1 | Comp. Ex. 3-2 | Comp. Ex. 3-3 |
|---|---|---|---|---|---|
| Optional function layer | | | | | |
| Low refractive index layer (L) | Refractive ratio |  | 1.37 | 1.37 | 1.37 |
|  | Thickness | [nm] | 100 | 100 | 100 |
| HC layer (H) | Refractive ratio |  | 1.62 | 1.62 | 1.62 |
|  | Thickness | [μm] | 6 | 6 | 15 |
| Protection film |  |  | A7 | A4 | A5 |
| Resin A | Tensile elastic modulus | [GPa] | 3.3 | — | — |
|  | Thickness | [μm] | 10 | — | — |
| Resin B | Tensile elastic modulus | [GPa] | 1.5 | — | — |
|  | Thickness | [μm] | 60 | — | — |
| Resin C | Tensile elastic modulus | [GPa] | — | 3.3 | 3.8 |
|  | Thickness | [μm] | — | 80 | 80 |
| Layer thickness | | [μm] | 80 | 80 | 80 |
| Unevenness |  |  | VG | VG | G |
| Moisture permeability |  | [g/m² · 24 h] | 40 | 41 | 250 |
| Optical anisotropy layer |  |  | B12 | B8 | B8 |
| Re(450)/Re(550) |  |  | 1.01 | 1.005 | 1.005 |

As shown in Tables 15 to 18, the polarization plates of Examples 3-1 to 3-6 were found to have almost no polarization degree change, no interference fringe and have excellent properties in the polarization degree change, light leakage degree (frame failure), surface hardness (pencil hardness), curling property, punching property and flexibility. The liquid crystal display devices of Examples 3-1 to 3-6 were found to exhibit no contrast unevenness and no color unevenness and be excellent in visibility. Therefore, they were found to have a high optical performance and an excellent strength.

On the contrary, the polarization plate of Comparative Example 3-1 was inferior in that the pencil hardness was reduced. The polarization plate of Comparative Example 3-2 was inferior in that the punching property and the flexibility were insufficient. The polarization plate of Comparative Example 3-3 was inferior in that the interference fringes occurred and the light leakage degree (frame failure), curling property, punching property and flexibility were insufficient. The liquid crystal display device using the polarization plate of Comparative Example 3-3 was insufficient in that the contrast was insufficient and the color unevenness occurred.

Example 3-7

Production of Touch Panel

An example of the touch panel of the present invention will be described with reference to FIG. 2.

A hard coat layer 21 having a thickness of 3 μm was formed on a surface having the optical compensation film (B8) of the observer-side polarization plate FP3-1 (having a protection film 3, a polarizer 2 and a optical compensation film 4) obtained in Example 3-1. Then a transparent conductive film 22 composed of the ITO film having a thickness of 25 nm was formed by DC magnetron sputter method to yield an upper electrode 23. A surface resistivity of the transparent conductive film 22 measured in the environment at 25° C. and 20% RH by four terminal method was 300 Ω/square.

A transparent conductive film (ITO) 25 having the surface resistivity of 400 Ω/square was formed on a surface of a glass plate 24 by the DC magnetron sputter method to yield a lower electrode 26. A dot spacer 27 having a pitch of 1 mm was formed on the surface having the transparent conductive film 25 on the glass plate 24, and the upper electrode 23 and the lower electrode 26 were adhered so that their transparent conductive films 22 and 25 were faced each other, to produce a touch panel 28.

The aforementioned touch panel was disposed at the observer side of the liquid crystal display device 3-1 obtained in Example 3-1 with directing the lower electrode 26 having the glass plate 24 toward the liquid crystal cell, to produce the liquid crystal display device with the touch panel.

In the produced liquid crystal display device, a white image at 1.5 V and a black image at 4.5 V were displayed, and the display property was visually evaluated from the front. As a result, in the white image and the black image, there was no coloration, and letter definition was good.

Comparative Example 3-4

An upper electrode of the touch panel was obtained in the same way as in Example 3-7 except that the transparent conductive film was formed on the side having the optical compensation film (B8) using the observer side polarization plate FP3-8 obtained in Comparative Example 3-2 in place of the observer-side polarization plate FP3-1. A liquid crystal display device with the touch panel was produced in the same way as in Example 3-7 except that this upper electrode was used in place of the upper electrode 23 of the Example 3-7.

The display property of the produced display device was evaluated, and the coloration was generally observed and out-of-focus letters were observed.

As described above, in the polarization plate of the present invention, the mechanical strength is high, and the interference fringes do not occur, the light leakage is reduced and the laminate films are not delaminated compared with the conventional polarization plates even when used under the high temperature and the high humidity. In addition, they have good properties in the curling property, the punching property and the flexibility, and the good optical compensation function. Such a polarization plate which is excellent in durability under the high temperature and the high humidity can be suitably used for flat panel displays such as touch panels and liquid crystal displays, and particularly the display devices having the big screen of 40 inches or more.

The invention claimed is:

1. A protection film comprising an intermediate layer containing a thermoplastic resin 1, a surface layer 2 containing a thermoplastic resin 2 laminated on a surface of said intermediate layer, and a surface layer 3 containing a thermoplastic resin 3 laminated on the other surface of said intermediate layer, either one or both of said surface layer 2 and said surface layer 3 being composed of an acrylic resin having a glass transition temperature (Tg) of 100° C. or higher, said intermediate layer containing an ultraviolet light absorber, one or more of said intermediate layer, said surface layer 2 and said surface layer 3 containing elastic particles, and wherein the thickness of either one or both of said surface layer 2 and said surface layer 3 is 10 μm or more.

2. The protection film according to claim 1, wherein said elastic particles are contained in said surface layer 2 and/or said surface layer 3.

3. The protection film according to claim 1, wherein, amoung said surface layers 2 and 3, at least one surface layer which is opposite to an object to be protected is composed of said acrylic resin having the glass transition temperature (Tg) of 100° C. or higher.

4. The protection film according to claim 1, wherein the thickness of said intermediate layer is 10 to 40 μm.

5. The protection film according to claim 1, wherein the total number of laminated layers of said protection film is 7 or less.

6. The protection film according to claim 1, wherein the moisture permeability of said protection film is 10 g/m²·24 hours or more and 200 g/m²·24 hours or less.

7. The protection film according to claim 1, wherein said protection film is obtained by coextrusion.

8. The protection film according to claim 1, wherein the thermoplastic resin 1 is a polymethylmethacrylate resin, an alicyclic olefin polymer, or cellulose acetate butylate.

* * * * *